United States Patent
Ishikawa

(10) Patent No.: US 10,356,382 B2
(45) Date of Patent: Jul. 16, 2019

(54) INFORMATION PROCESSING DEVICE, INFORMATION PROCESSING METHOD, AND PROGRAM

(71) Applicant: SONY CORPORATION, Tokyo (JP)

(72) Inventor: Tsuyoshi Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/840,742

(22) Filed: Dec. 13, 2017

(65) Prior Publication Data

US 2018/0199023 A1    Jul. 12, 2018

(30) Foreign Application Priority Data

Jan. 12, 2017    (JP) .................. 2017-003423

(51) Int. Cl.

| | |
|---|---|
| *H04N 5/93* | (2006.01) |
| *G11B 27/00* | (2006.01) |
| *H04N 5/92* | (2006.01) |
| *H04N 13/117* | (2018.01) |
| *G11B 27/10* | (2006.01) |
| *H04N 13/128* | (2018.01) |
| *H04N 13/189* | (2018.01) |
| *H04N 13/344* | (2018.01) |
| *H04N 13/279* | (2018.01) |
| *H04N 5/89* | (2006.01) |
| *H04N 13/00* | (2018.01) |
| *H04N 7/18* | (2006.01) |

(52) U.S. Cl.
CPC .......... *H04N 13/117* (2018.05); *G11B 27/10* (2013.01); *H04N 13/128* (2018.05); *H04N 13/189* (2018.05); *H04N 13/279* (2018.05); *H04N 13/344* (2018.05)

(58) Field of Classification Search
USPC ............... 386/278, 280, 326, 335, 239, 248; 348/42, 61
See application file for complete search history.

(56) References Cited

U.S. PATENT DOCUMENTS

2010/0197395 A1     8/2010  Geiss
2010/0306716 A1*   12/2010  Perez ..................... G06F 3/011
                                                                715/863
2018/0174347 A1*    6/2018  Chaney .................. G06T 13/40

OTHER PUBLICATIONS

Aug. 20, 2018, European Search Report issued for related EP application No. 18161210.2.
Burns et al., Macbeth: The avatar which I see before me and its movement toward my hand, IEEE Virtual Reality Conference 2007, Mar. 10-14, 2007, pp. 295-296, Charlotte, North Carolina, USA.
Nov. 26, 2018, European Search Report issued for related EP application No. 18161210.2.

* cited by examiner

*Primary Examiner* — Daquan Zhao
(74) *Attorney, Agent, or Firm* — Paratus Law Group, PLLC

(57) ABSTRACT

There is provided an information processing device including a change unit configured to change arrangement of a first object corresponding to a first user and a second object corresponding to a second user from first arrangement to second arrangement in accordance with reproduction of a video including depth information, in a virtual space corresponding to the video.

17 Claims, 18 Drawing Sheets

FIG. 10
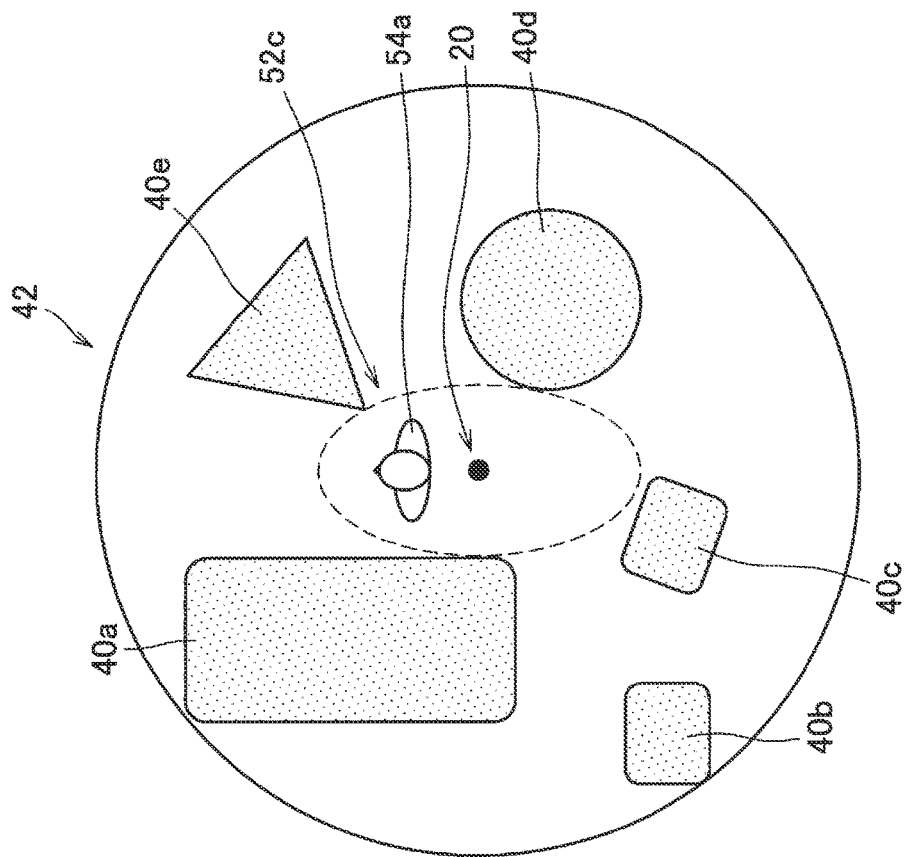
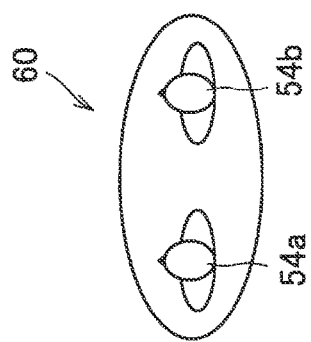

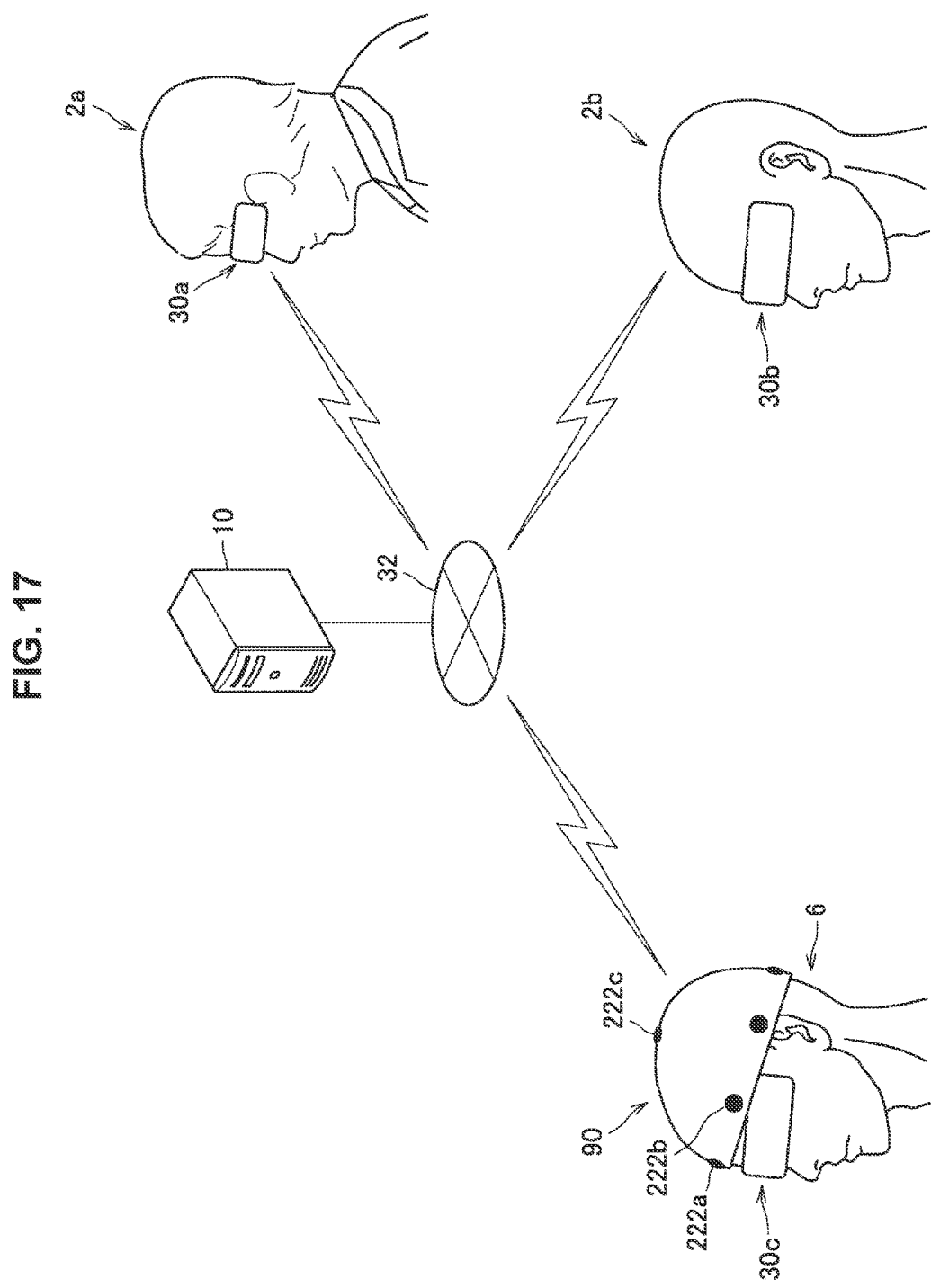

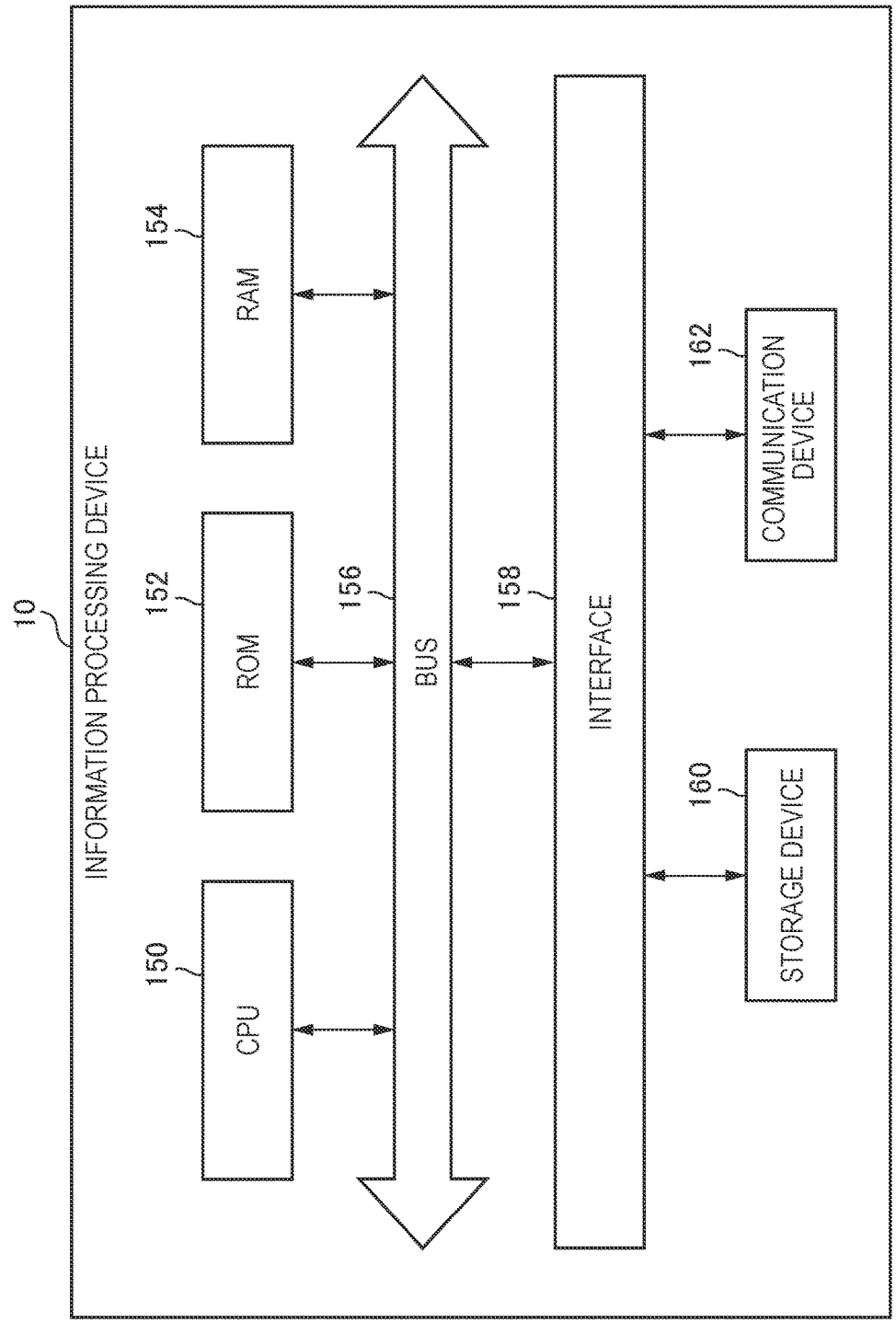

INFORMATION PROCESSING DEVICE, INFORMATION PROCESSING METHOD, AND PROGRAM

CROSS REFERENCE TO RELATED APPLICATIONS

This application claims the benefit of Japanese Priority Patent Application JP 2017-003423 filed Jan. 12, 2017, the entire contents of which are incorporated herein by reference.

BACKGROUND

The present disclosure relates to an information processing device, an information processing method, and a program.

In the related art, various kinds of technologies related to virtual reality (VR) have been developed. In the VR, it is possible for users to view videos generated by computers with a high realistic sensation.

For example, JP 2014-17776A describes a technology of mapping a character corresponding to a user wearing a head-mounted display (HMD) in a virtual space on the basis of information regarding a real position measured by the HMD. In addition, JP 2016-105593A describes a technology of causing an HMD to display 360-degree virtual reality (VR) content.

SUMMARY

However, if the technologies of JP 2014-17776A and JP 2016-105593A are assumed to be applied to a case of reproducing a video corresponding to a virtual space, arrangement of a plurality of objects in the virtual space does not change even when a reproduction timing of the video changes while using the technologies of JP 2014-17776A and JP 2016-105593A.

Accordingly, the present disclosure proposes a novel and improved information processing device, information processing method, and program that are capable of adaptively changing arrangement of a plurality of objects in a virtual space in accordance with reproduction of a video corresponding to the virtual space.

According to an embodiment of the present disclosure, there is provided an information processing device including a change unit configured to change arrangement of a first object corresponding to a first user and a second object corresponding to a second user from first arrangement to second arrangement in accordance with reproduction of a video including depth information, in a virtual space corresponding to the video.

In addition, according to an embodiment of the present disclosure, there is provided an information processing method including changing, by a processor, arrangement of a first object corresponding to a first user and a second object corresponding to a second user from first arrangement to second arrangement in accordance with reproduction of a video including depth information, in a virtual space corresponding to the video.

In addition, according to an embodiment of the present disclosure, there is provided a program causing a computer to function as a change unit configured to change arrangement of a first object corresponding to a first user and a second object corresponding to a second user from first arrangement to second arrangement in accordance with reproduction of a video including depth information, in a virtual space corresponding to the video.

As described above, according to the embodiments of the present disclosure, it is possible to adaptively change arrangement of a plurality of object in the virtual space in accordance with reproduction of a video corresponding to the virtual space. Note that the effects described here are not necessarily limited, and any effect that is desired to be described in the present disclosure may be exhibited.

BRIEF DESCRIPTION OF THE DRAWINGS

FIG. 10 is a diagram illustrating an example of changing the number of avatars arranged in a virtual space at a certain reproduction timing;

FIG. 17 is an explanatory diagram illustrating a configuration example of an information processing system according to an application example of the embodiment; and FIG. 18 is an explanatory diagram illustrating a hardware configuration example of the information processing device 10 according to the embodiment.

DETAILED DESCRIPTION OF THE EMBODIMENT(S)

Figure 1:
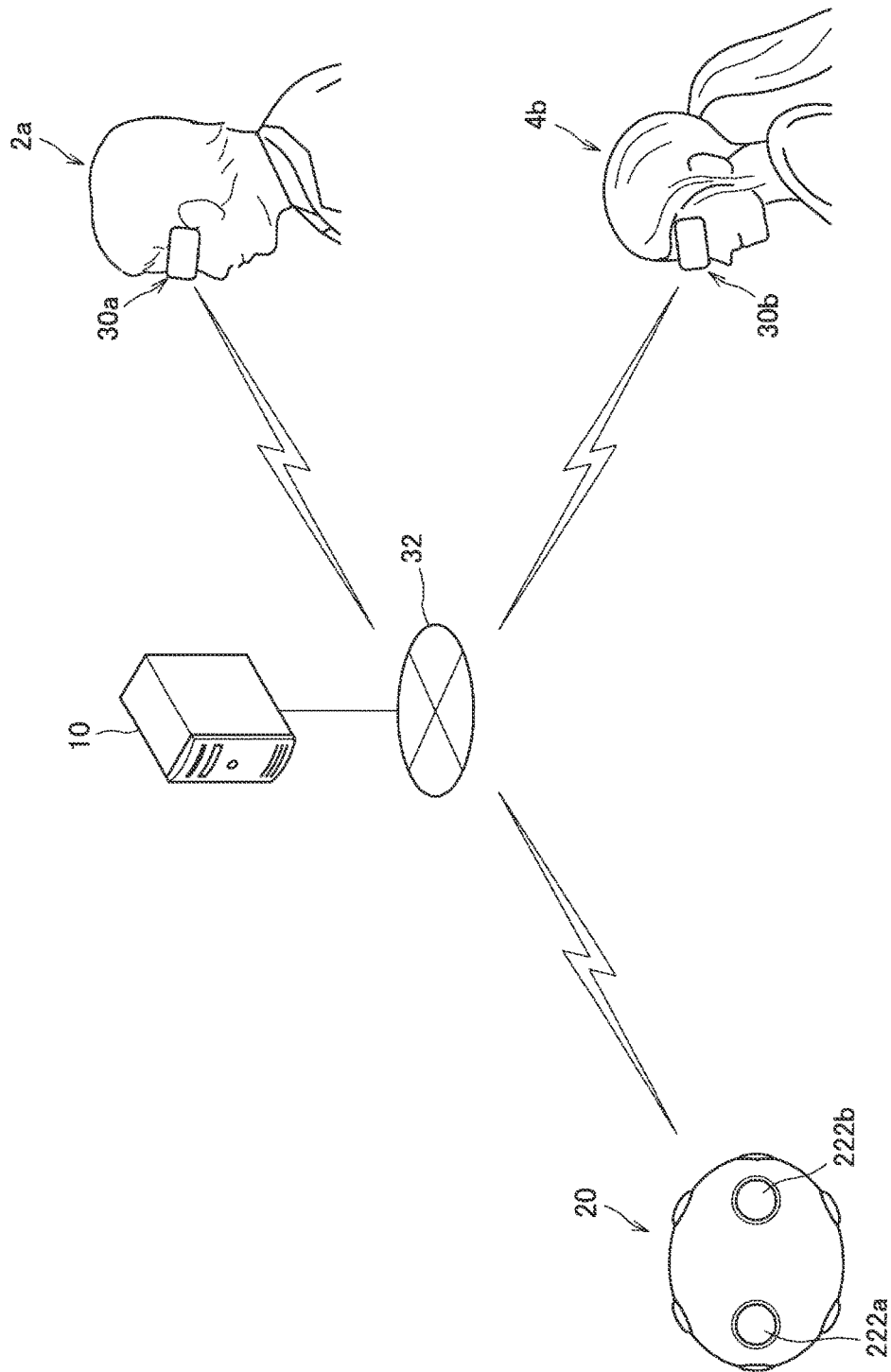
FIG. 1 is an explanatory diagram illustrating a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numbers, and repeated explanation of these structural elements is omitted.

Note that, in this description and the drawings, structural elements that have substantially the same function and structure are sometimes distinguished from each other using different alphabets after the same reference number. For example, a plurality of structural elements that have substantially the same function and structure are distinguished into a video production device 20a and a video production device 20b as necessary. However, when it is not necessary to distinguish structural elements that have substantially the same function and structure, the same reference number alone is attached. For example, in a case where it is not necessary to distinguish the video production device 20a and the video production device 20b from each other, they are simply referred to as the video production devices 20.

"DETAILED DESCRIPTION OF THE EMBODIMENT (S)" will be described according to an order of items listed below.
1. Configuration of information processing system
2. Detailed description of embodiment
3. Hardware configuration
4. Modification «1. Configuration of Information Processing System»

First, with reference to FIG. 1, a configuration example of an information processing system according to an embodiment of the present disclosure will be described. As illustrated in FIG. 1, the information processing system according to the embodiment includes an information processing device 10, a video production device 20, reproduction devices 30, and a communication network 32.

<1-1. Video Production Device 20>

The video production device 20 is a device configured to record videos (such as moving images) of a real space. The video production device 20 may be a stationary device, a mobile device, or an autonomous mobile device.

As illustrated in FIG. 1, the video production device 20 may include a plurality of image capturing units 222. For example, the image capturing units 222 include a camera (RGB camera). For example, it is possible for the video production device 20 to take a video (such as omnidirectional video) of the entire surroundings (360 degrees) of the video production device 20 on the basis of videography performed by the plurality of the image capturing unit 222.

Note that, it may be possible to specify depth information around the video production device 20 by the information processing device 10 (to be described later) performing predetermined image processing on respective videos taken by the plurality of image capturing units 222 at the same time, for example. Alternatively, the video production device 20 may further include a depth sensor or a rangefinder. In this case, it is possible for the video production device 20 to consecutively measure depth information of the entire surroundings of the video production device 20 while capturing images by using the plurality of image capturing units 222. Here, the depth information may indicate depth values at respective reproduction timings of a video corresponding to the depth information. Each of the depth values may be set to a surrounding of a point of view in the video at a corresponding time of recording the video.

Figure 2:
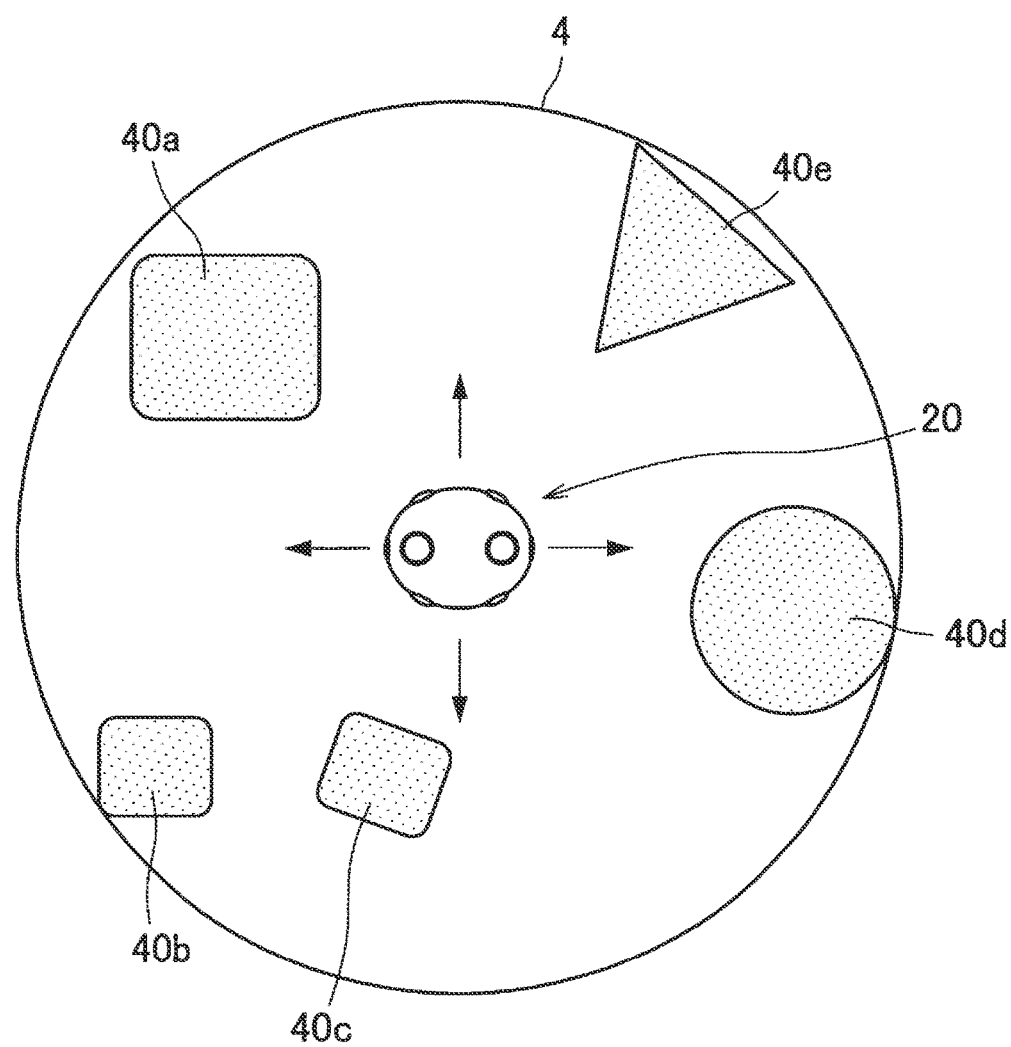
FIG. 2 is an explanatory diagram illustrating an example of videography performed by a video production device 20 according to the embodiment.

For example, as illustrated in FIG. 2, it is assumed that a plurality of objects 40 are arranged in the entire surroundings 4 of the video production device 20. In this case, video data of the entire surroundings of the video production device 20 and a depth value of the entire surroundings may be acquired with regard to each frame on the basis of images captured by the plurality of image capturing unit 222 included in the video production device 20. Here, basically, the plurality of objects 40 may be real objects. However, the plurality of objects 40 are not limited thereto. The plurality of objects 40 may include a virtual object. In this case, the virtual object may be registered in advance in association with position information in the real space. Subsequently, for example, the video production device 20 may acquire color information and depth values of each virtual object associated with position information in the entire surroundings 4 of the video production device 20, from the video production device 20.

Figure 3:
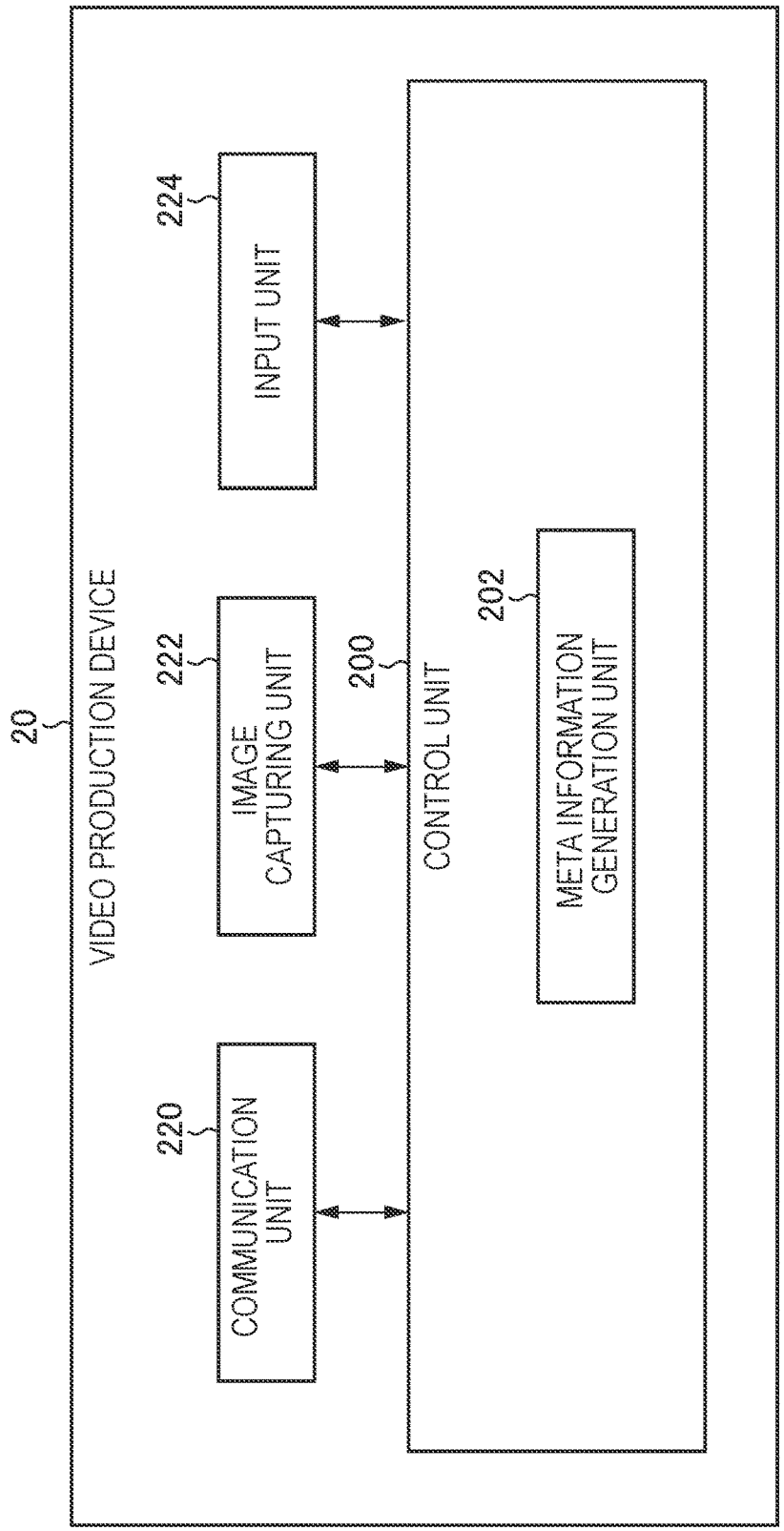
FIG. 3 is a functional block diagram illustrating a configuration example of the video production device 20 according to the embodiment.

Here, with reference to FIG. 3, a functional configuration example of the video production device 20 will be described. As illustrated in FIG. 3, the video production device 20 includes a control unit 200, a communication unit 220, an image capturing unit 222, and an input unit 224.

{1-1-1. Control Unit 200}

The control unit 200 controls overall operation of the video production device 20 by using a central processing unit (CPU), random access memory (RAM), and the like embedded in the video production device 20, for example. In addition, as illustrated in FIG. 3, the control unit 200 includes a meta information generation unit 202.

{1-1-2. Meta Information Generation Unit 202}

The meta information generation unit 202 generates meta information in association with a video taken by the image capturing unit 222 (to be described later). For example, the meta information generation unit 202 generates meta information including relevant information designated by a user (such as producer) with regard to a video taken by the image capturing unit 222. Note that, the relevant information may be input by the user via the input unit 224 (to be described later), or may be received by another device (not illustrated) via the communication network 32.

Here, the relevant information may include information regarding an empty space around the video production device 20 (such as a size of the empty space) for each reproduction timing of a video designated by the user, for example. Objects (such as avatars) corresponding to respective users who views the video may be arranged in the empty space. Details thereof will be described later.

In addition, the relevant information may include information regarding a scene change timing in a taken video designated by a user. In addition, the relevant information may further include a setting of arrangement of objects at the scene change timing (such as designation of a row of a plurality of objects, or designation of the number of objects to be arranged). Here, the scene change timing may be a timing at which scenes are switched in the video. Note that, the producer can set any timing in the video as the scene change timing. For example, the producer can set his/her desired timing as the scene change timing even in the case where there is a wide empty space around the video production device 20. As an example, even at a timing in which there is the wide empty space, it is possible for the producer to set a timing at which the producer wants to make a situation where a user who is viewing the video is alone, as the scene change timing.

{1-1-3. Communication Unit 220}

The communication unit 220 exchanges information with another device. For example, under the control of the control unit 200, the communication unit 220 transmits videos taken by the plurality of the image capturing unit 222 and meta information associated with the videos, to the information processing device 10. Note that, formats of the meta information and the videos taken by the plurality of the image capturing units 222 are not specifically limited. Any format may be used.

{1-1-4. Image Capturing Unit 222}

The image capturing unit 222 may include a camera (RGB camera). The image capturing unit 222 takes videos such as moving images. For example, the image capturing unit 222 takes videos by collecting light in an image sensor included in the camera via lenses included in the camera.

{1-1-5. Input Unit 224}

The input unit 224 may include a touchscreen, a button, a lever, a switch, or the like. The input unit 224 receives various kinds of input performed by a user. For example, the input unit 224 receives the relevant information input by the user.

<1-2. Information Processing Device 10>

The information processing device 10 is a device configured to manage the videos, meta information, and the like received from the video production device 20. For example, the information processing device 10 is a server. However, the information processing device 10 is not limited thereto. The information processing device 10 may be a general-purpose personal computer (PC), a tablet terminal, a game console, a mobile phone such as a smartphone, a portable music player, a wearable device such as the HMD, a robot, or the like. Note that, FIG. 1 illustrates the single information processing device 10 only. However, the embodiment is not limited thereto. The functions of the information processing device 10 according to the embodiment may be achieved by operating a plurality of computers cooperatively.

For example, the information processing device 10 manages the received videos and meta information in association with each other. In addition, the information processing device 10 may manage the received videos further in association with corresponding depth information. Note that, as described above, it is possible for the information processing device 10 to specify depth information corresponding to a video received from the video production device 20, by performing predetermined image processing on the video (such as respective videos taken by the plurality of the image capturing units 222 at the same time). Alternatively, the depth information may be information sensed by a predetermined sensor at the same time as videography. The predetermined sensor is included in the video production device 20.

In addition, it is possible for the information processing device 10 to cause respective reproduction devices 30 used by the plurality of users who wants to view a reproduction target video, to display the reproduction target video among videos received from the video production device 20. Accordingly, it is possible for the plurality of users to view the video at the same time, for example. Here, the plurality of users may be located side-by-side in a real space or may be located away from each other in the real space.

Here, the reproduction target video may be a video corresponding to a reproduction request received from the reproduction device 30 among videos registered in a video DB 124 (to be described later).

In addition, the reproduction target video may be an omnidirectional video, for example. In addition, the reproduction target video may be a free-viewpoint video. Here, the free-viewpoint video may be data showing a video viewed from a free viewpoint in a three-dimensional virtual space generated on the basis of videos taken by the plurality of image capturing units 222 included in the video production device 20. For example, the free-viewpoint video may be data showing a video of the virtual space viewed from a point of view when freely and virtually moving the point of view in the three-dimensional virtual space.

<1-3. Reproduction Device 30>

For example, the reproduction device 30 is a device configured to display videos or the like received from the information processing device 10. For example, the reproduction device 30 transmits a video reproduction request to the information processing device 10 on the basis of input performed by a user on the reproduction device 30. Subsequently, the reproduction device 30 displays a video received from the information processing device 10.

As illustrated in FIG. 1, for example, the reproduction device 30 may be a head-mounted device such as the HMD. For example, the reproduction device 30 may be a non-see-through HMD, or may be a see-through HMD. Alternatively, the reproduction device 30 may be a 3D projector, and the 3D projector may project a video on a projection target (such as a wall or a screen). Note that, next, an example in which the reproduction device 30 is a head-mounted device will mainly be described.

Figure 4:
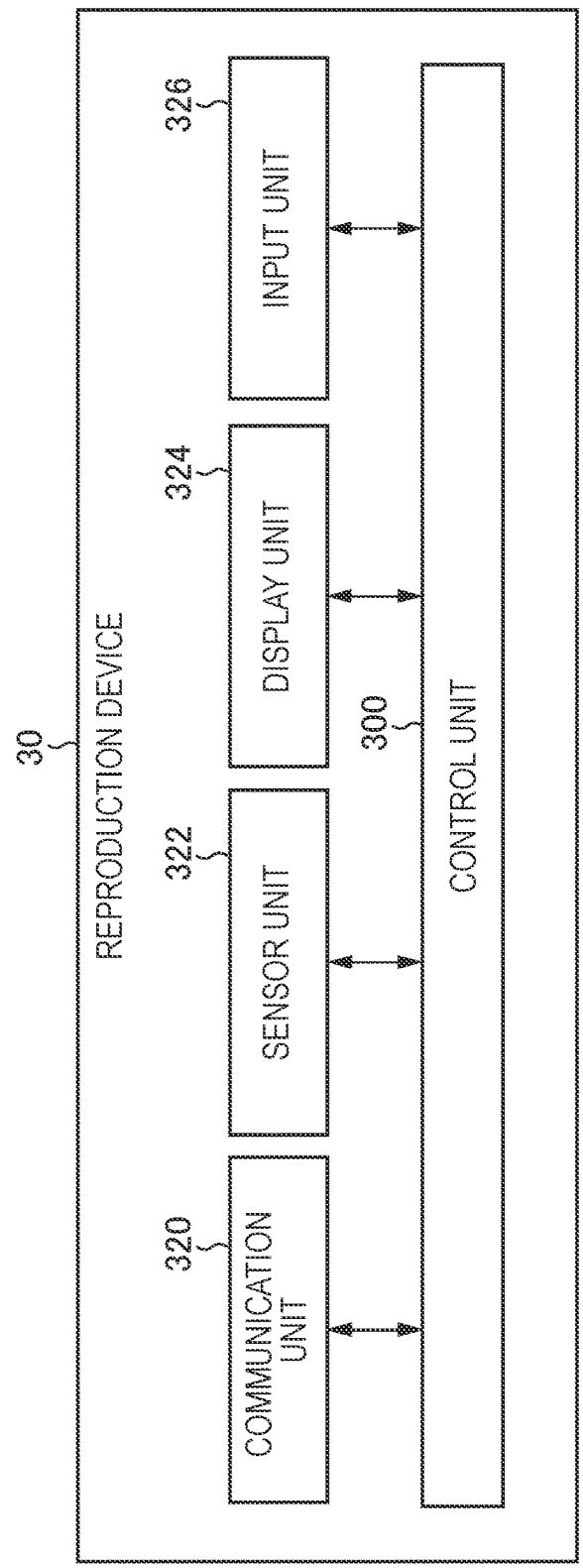
FIG. 4 is a functional block diagram illustrating a configuration example of a reproduction device 30 according to the embodiment.

Here, with reference to FIG. 4, a functional configuration example of the reproduction device 30 will be described. As illustrated in FIG. 4, the reproduction device 30 includes a control unit 300, a communication unit 320, a sensor unit 322, a display unit 324, and an input unit 326.

{1-3-1. Control Unit 300}

For example, the control unit 300 controls overall operation of the reproduction device 30 by using a CPU, a graphics processing unit (GPU), RAM, and the like embedded in the reproduction device 30. For example, the control unit 300 causes the display unit 324 to display a video received from the information processing device 10. As an example, in the case where an omnidirectional video is received from the information processing device 10, the control unit 300 causes the display unit 324 to display a partial video corresponding to information regarding a position and an attitude of the reproduction device 30 (or a user, etc.) sensed by the sensor unit 320 (to be described later), in the omnidirectional video.

In addition, in the case where the display unit 324 (to be described later) includes a right-eye display unit 324a and a left-eye display unit 324b, the control unit 300 may generate a right-eye image and a left-eye image on the basis of a video received from the information processing device 10, cause the right-eye display unit 324a to display the right-eye image, and cause the left-eye display unit 324b to display the left-eye image. As a result, it is possible for a user to view a stereoscopic video.

In addition, it is possible for the control unit 300 to perform various kinds of recognition processes on the basis of a result of sensing performed by the sensor unit 322. For example, the control unit 300 recognizes behavior (such as gesture made by a user or movement of a user) of a user wearing the reproduction device 30 on the basis of the result of sensing.

{1-3-2. Communication Unit 320}

The communication unit 320 exchanges information with another device. For example, under the control of the control unit 300, the communication unit 320 transmits a video reproduction request to the information processing device 10. In addition, the communication unit 320 receives a reproduction target video from the information processing device 10.

{1-3-3. Sensor Unit 322}

For example, the sensor unit 322 may include a camera (image sensor), a depth sensor, a microphone, an acceleration sensor, a gyroscope, a geomagnetic sensor, and/or a Global Positioning System (GPS) receiver. For example, the sensor unit 322 senses a position of the reproduction device 30 (or a position of a user using the reproduction device 30) in a real space, an attitude, acceleration, or the like of the reproduction device 30. In addition, it is possible for the sensor unit 322 to sense depth information around the reproduction device 30.

{1-3-4. Display Unit 324}

The display unit 324 displays a video under the control of the control unit 300. For example, the display unit 324 may include the right-eye display unit 324a and the left-eye display unit 324b. In this case, the right-eye display unit 324a projects a video on an at least partial area of a right-eye lens included in the reproduction device 30, and the left-eye display unit 324b projects a video on an at least partial area of a left-eye lens included in the reproduction device 30. The partial areas serve as projection planes. Alternatively, in the case where the reproduction device 30 has a goggles-type lens, the display unit 324 may project a video on an at least partial area of the goggles-type lens, which serves as a projection plane. Note that, the left-eye lens and the right-eye lens (or the goggles-type lens) may include transparent material such as resin or glass.

Alternatively, the display unit 324 may be a non-see-through display device. For example, the display unit 324 may include a liquid crystal display (LCD), or an organic light emitting diode (OLED). Note that, in this case, the display unit 324 may consecutively display a video of a view in front of a user. The video is taken by the sensor unit 322 (camera). Accordingly, it is possible for the user to see a view in front of the user via the video displayed on the display unit.

{1-3-5. Input Unit 326}

The input unit 326 may include a touchscreen, a button, a lever, a switch, or the like. The input unit 326 receives various kinds of input performed by a user. Avatars corresponding to respective users wearing the reproduction devices 30 may be arranged in a virtual space corresponding to a reproduction target video. Details thereof will be described later. In this case, the input unit 326 receives input performed by a user to change arrangement positions of the avatars.

<1-4. Communication Network 32>

The communication network 32 is a wired or wireless transmission line through which information is transmitted from devices connected with the communication network 32. For example, the communication network 32 may include a public network, various kinds of local area networks (LANs), a wide area network (WAN), and the like. The public network includes the Internet, a satellite communication network, a telephone network, and the like, and the LANs include Ethernet (registered trademark). In addition, the communication network 32 may include a dedicated line network such as an Internet Protocol Virtual Private Network (IP-VPN).

<1-5. Organizing of Problems>

The configuration of the information processing system according to the embodiment has been described above. Meanwhile, in the related art, various kinds of technologies of displaying a video showing all directions (360 degrees) from the camera (such as omnidirectional video) have been developed. According to this technology, users can view the omnidirectional video and see the entire surroundings of the camera obtained when the video has been taken.

In addition, a technology of allowing a plurality of users to view an omnidirectional video at the same time and displaying the omnidirectional video on which objects (such as avatars) corresponding to the plurality of users viewing the video at the same time are overlapped has been proposed. According to this technology, user can recognize another user viewing the video at the same time by looking around while viewing the omnidirectional video.

However, when using the known technologies, sometimes an avatar of a viewer may be displayed inappropriately in the omnidirectional video. For example, when avatars corresponding to users are displayed as they are (such as displaying avatars in a single lateral row) in a scene where the users go through a very narrow space, sometimes the avatars may be displayed such that they are embedded in an object such a wall in the video and the video may become messed up.

Therefore, the information processing device 10 according to the embodiment has been developed in view of the above described circumstance. By using the information processing device 10 according to the embodiment, it is possible to change arrangement of respective avatars corresponding to a plurality of users in a virtual space corresponding to a reproduction target video, in accordance with reproduction of the video. Therefore, it is possible to appropriately change arrangement of the avatars corresponding to the respective users viewing the video, in accordance with reproduction of the video. Here, the avatar is an example of the object according to the embodiment. In addition, basically, the avatar is a three-dimensional virtual object.

«2. Detailed Description of Embodiment»

<2-1. Configuration>

Figure 5:
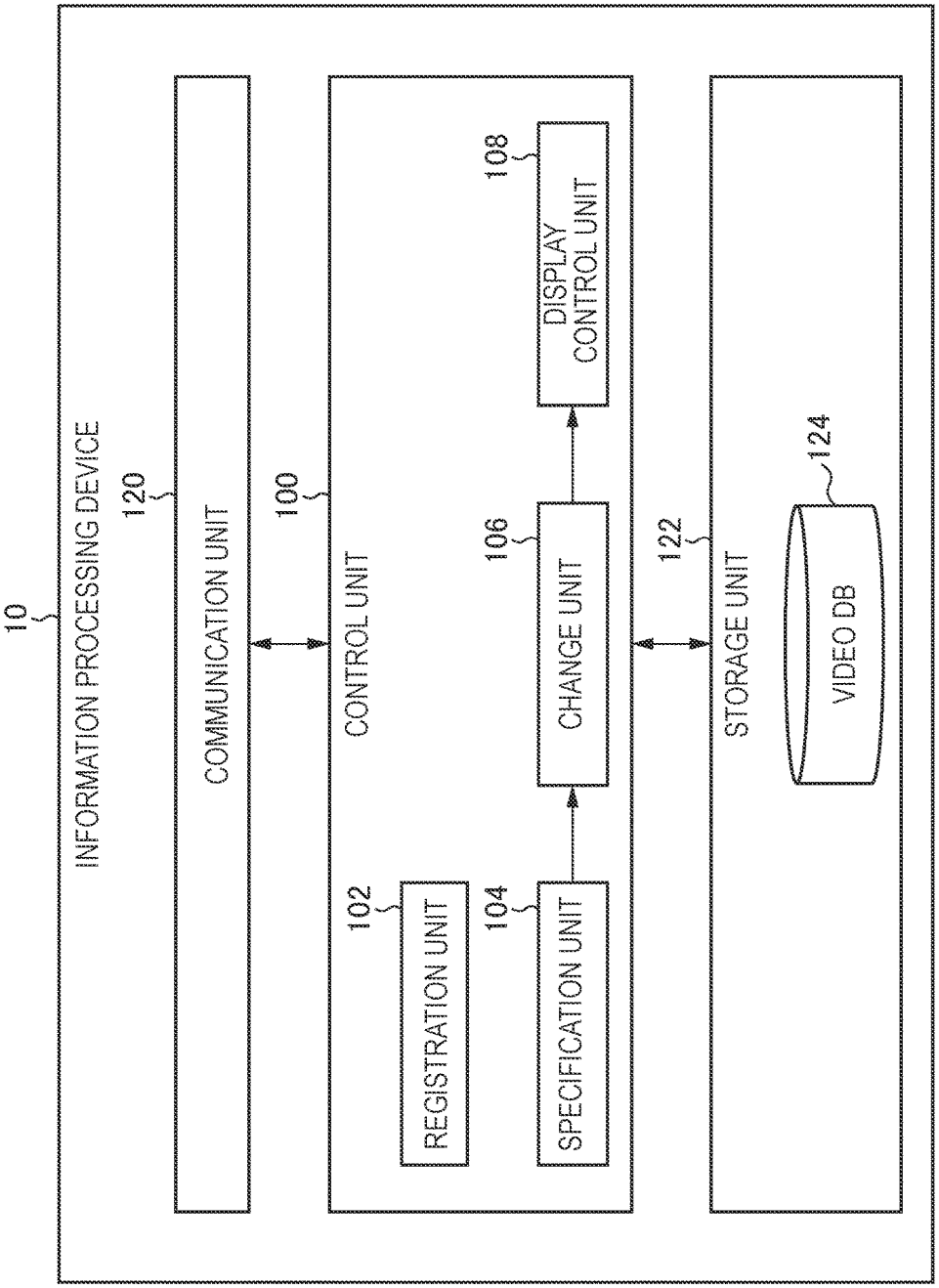
FIG. 5 is a functional block diagram illustrating a configuration example of an information processing device 10 according to the embodiment.

Next, details of the configurations according to the embodiment will be described. FIG. 5 is a functional block diagram illustrating a configuration example of the information processing device 10 according to the embodiment. As illustrated in FIG. 5, the information processing device 10 includes a control unit 100, a communication unit 120, and a storage unit 122.

{2-1-1. Control Unit 100}

For example, the control unit 100 may include processing circuits such as a GPU and a CPU 150 (to be described later). The control unit 100 controls overall operation of the information processing device 10. In addition, as illustrated in FIG. 5, the control unit 100 includes a registration unit 102, a specification unit 104, a change unit 106, and a display control unit 108.

{2-1-2-. Registration Unit 102}

The registration unit 102 registers meta information, videos, and the like received from the video production device 20 on the video DB 124. For example, the registration unit 102 additionally registers a video and depth information associated with the video on the video DB 124 each time the video is acquired from the video production device 20. Note that, for example, the video DB 124 is a database in which videos, depth information, and meta information are stored in association with each other.

{2-1-3. Specification Unit 104}

(2-1-3-1. Specification of Information Regarding Empty Space}

Specification Example 1

For example, when reproducing a reproduction target video, the specification unit 104 specifies information regarding an empty space in a surrounding of a point of view at a time of recording the video (such as a size, a range, and the like of the empty space) for each reproduction timing of the video. For example, the specification unit 104 specifies information regarding the empty space for each reproduction timing of the reproduction target video on the basis of depth information associated with the video.

As an example, the specification unit 104 first extracts depth information stored in the video DB 124 in association with a reproduction target video. Next, the specification unit 104 generates a three-dimensional virtual space corresponding to the video at each reproduction timing of the reproduction target video on the basis of the extracted depth information, and specifies an empty space in a surrounding of a point of view at a time of recording the video on the basis of the three-dimensional virtual space.

Figure 6:
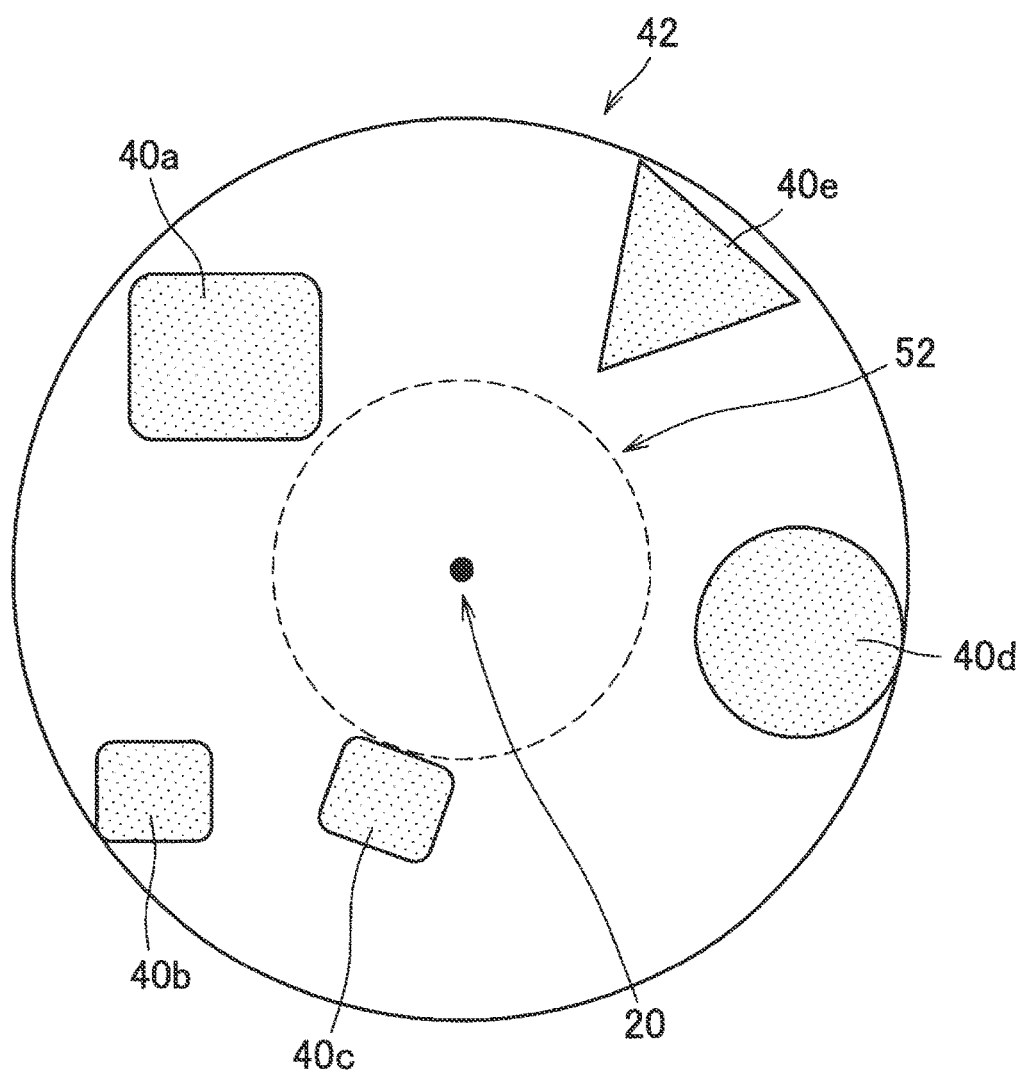
FIG. 6 is a diagram illustrating an example of a virtual space generated at a certain reproduction timing.

Next, with reference to FIG. 6, details of the above described functions will be described. FIG. 6 is a top view illustrating an example of a virtual space (virtual space 42) corresponding to a certain reproduction timing of a reproduction target video. As illustrated in FIG. 6, virtual objects 40 may be arranged in the virtual space 42. The virtual objects 40 correspond to respective real objects located in the entire surroundings of the video production device 20 during videography at the reproduction timing. Note that, positions of the respective real objects may be specified on the basis of depth information associated with the video. In this case, as illustrated in FIG. 6, the specification unit 104 specifies an empty space 52 in a surrounding of a point of view during videography by calculating a distance between each virtual object 40 in the virtual space 42 and a position of the video production device 20 in the virtual space 42 during videography.

Specification Example 2

Alternatively, for example, in the case where information regarding an empty space in a surrounding of a point of view at a time of recording a reproduction target video for each reproduction timing is registered in advance (by a producer, for example) in meta information associated with the reproduction target video, it is also possible for the specification unit 104 to specify the information regarding the empty space for each reproduction timing of the video, on the basis of the meta information.

(2-1-3-2. Specification of Scene Change Timing)
Specification Example 1

In addition, for example, when reproducing a video, it is possible for the specification unit 104 to specify a scene change timing related to the video on the basis of information regarding an empty space specified at each reproduction timing of the reproduction target video. For example, the specification unit 104 specifies a scene change timing related to the video on the basis of sizes of respective avatars corresponding to a plurality of users viewing the reproduction target video, current positions of the plurality of avatars (such as row), and information regarding an empty space for each reproduction timing.

For example, in accordance with reproduction of a video, the specification unit 104 determines whether a current row of the plurality of avatars is within an empty space indicated by information regarding the empty space, at each reproduction timing. Next, each time it is determined that the current row of the plurality of avatars is not within the empty space, the specification unit 104 consecutively specifies the reproduction timing as a scene change timing.

Figure 7:
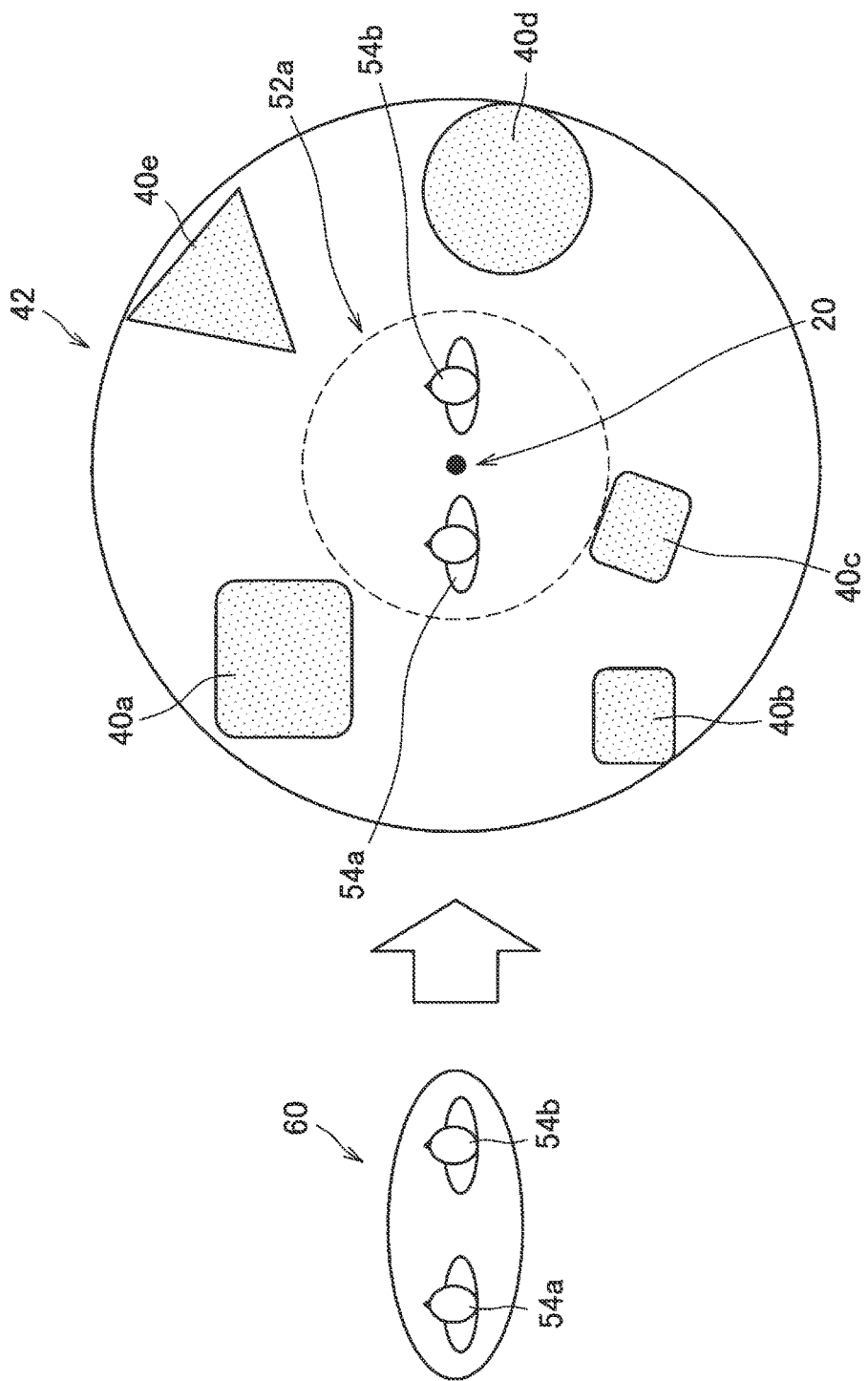
FIG. 7 is a diagram illustrating an example of arranging a plurality of avatars in a virtual space at a certain reproduction timing.

Next, with reference to FIG. 7 and FIG. 8, details of the above described functions will be described. FIG. 7 is a diagram illustrating an example of a virtual space (virtual space 42) at a certain reproduction timing of a reproduction target video, and an example of a row (row 60) of a plurality of avatars 54 before the reproduction timing. Note that, FIG. 7 illustrates an example of the current row 60 in which the respective avatars 54 corresponding to two users viewing the video forms a single lateral row. In the example illustrated in FIG. 7, the specification unit 104 determines that the current row 60 is within an empty space 52a by comparing a size of the current row 60 of the plurality of avatars and a size of the empty space 52a (at the reproduction timing as illustrated in FIG. 7). Subsequently, the specification unit 104 determines that the reproduction timing illustrated in FIG. 7 is not the scene change timing.

Figure 8:
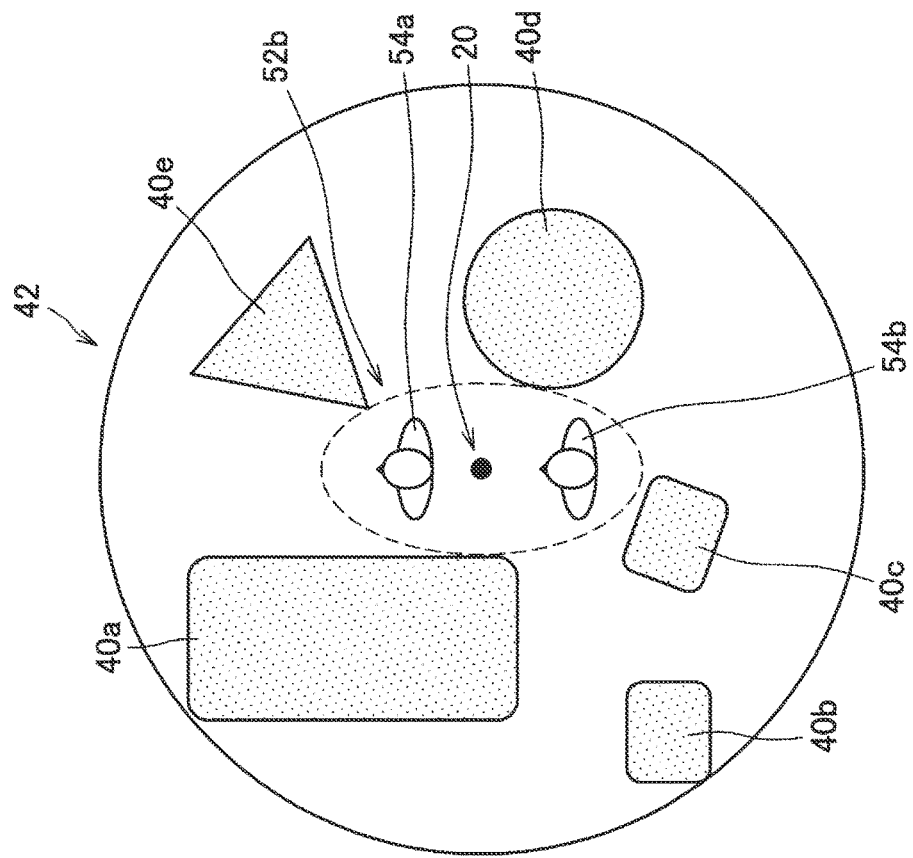
FIG. 8 is a diagram illustrating an example of arranging a plurality of avatars in a virtual space at a certain reproduction timing.

In addition, FIG. 8 illustrates an example of a virtual space (virtual space 42) at a reproduction timing different from the example illustrated in FIG. 7, and an example of the row (row 60) of the plurality of avatars 54 before the reproduction timing. In the example illustrated in FIG. 8, a part of the space corresponding to the current row 60 is out of an empty space 52b (at a reproduction timing illustrated in FIG. 8). Therefore, the specification unit 104 determines that the current row 60 is not within the empty space 52b. Subsequently, the specification unit 104 determines that the reproduction timing illustrated in FIG. 8 is the scene change timing.

Specification Example 2

Alternatively, in the case where information regarding the scene change timing is registered in advance (by a producer, for example) in meta information associated with the reproduction target video, it is also possible for the specification unit 104 to specify the scene change timing as it is indicated by the meta information, as a scene change timing in the video.

{2-1-4. Change Unit 106}
(2-1-4-1. Arrangement of Avatars)

The change unit 106 arranges respective avatars corresponding to a plurality of users viewing a reproduction target video, in a virtual space corresponding to the video. For example, the change unit 106 arranges the respective avatars corresponding to the plurality of users in an empty space specified by the specification unit 104.

Figure 9:
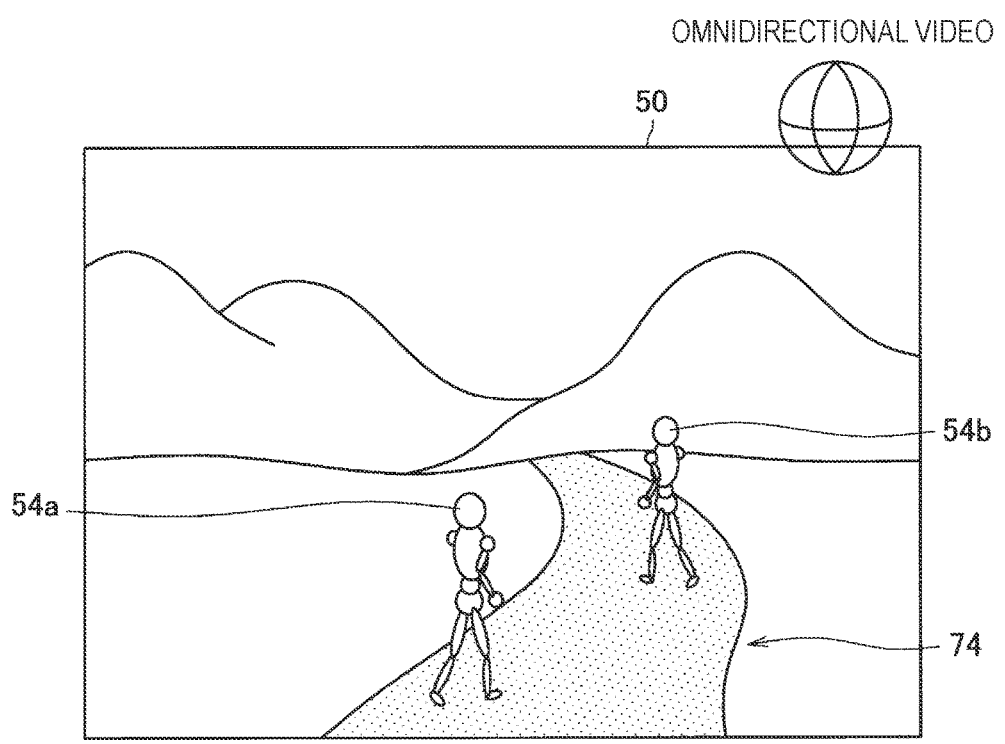
FIG. 9 is a diagram illustrating an example of arranging a plurality of avatars on a horizontal plane recognized from a reproduction target video.

Here, the empty space may be a space on a horizontal plane (such as a ground or a floor). For example, the specification unit 104 may recognize a horizontal plane on the basis of predetermined image processing performed on a reproduction target video (or on the basis of depth information associated with the video), and specify a space on the recognized horizontal plane as the empty space. In this case, as illustrated in FIG. 9, the change unit 106 may arrange the avatars 54 corresponding to respective users on a horizontal plane 74 recognized by the specification unit 104, for example. In addition, the change unit 106 may change arrangement positions of the avatars 54 corresponding to the respective users on the horizontal plane 74 in accordance with a result of recognizing behavior (such as movement) of the respective users in a real space where the respective users are located, for example. This can achieve display of a video as if the avatars 54 are walking on the horizontal plane 74. As a result, for example, the users can communicate with each other with high realistic sensations in an omnidirectional video 50 displayed on (the display units 324) of the reproduction devices 30.

Modification

Note that, as a modification, the change unit 106 does not have to arrange the avatars in a predetermined space in an empty space specified by the specification unit 104. Here, for example, the predetermined space may be a place where it is unnatural to locate people such as a hole in a floor or a ground.

(2-1-4-2. Change in Row of Avatars)

In addition, the change unit 106 dynamically changes settings of display of respective avatars corresponding to the plurality of users in a virtual space corresponding to a reproduction target video, in accordance with reproduction of the video. For example, the change unit 106 changes current arrangement (such as row) of the respective avatars corresponding to the plurality of users to another arrangement (such as row) at each reproduction timing of the reproduction target video in accordance with information regarding an empty space (at the reproduction timing) and the respective avatars corresponding to the plurality of users. Here, the "current arrangement" is an example of the first arrangement according to an embodiment of the present disclosure. In addition the "another arrangement" is an example of the second arrangement according to an embodiment of the present disclosure.

For example, when the specification unit 104 specifies that a current reproduction timing is a scene change timing during reproduction of a video, the change unit 106 changes a current row of the plurality of avatars to another row such that the respective avatars corresponding to the plurality of users fall within an empty space indicated by information regarding the empty space at the current reproduction timing. As an example, each time a current reproduction timing is specified as a scene change timing during reproduction of a video, the change unit 106 consecutively changes a current row of the plurality of avatars to another row such that the respective avatars corresponding to the plurality of users fall within an empty space indicated by information regarding the empty space at the current reproduction timing. Alternatively, when the specification unit 104 specifies that a current reproduction timing is a scene change timing, it is also possible for the change unit 106 to change an orientation (such as attitude) of at least one avatar among the plurality of avatars such that the respective avatars corresponding to the plurality of users fall within an empty space indicated by information regarding the empty space at the current reproduction timing.

For example, the change unit 106 does not change the current row 60 of the plurality of avatars 54 (illustrated in FIG. 7) in the example illustrated in FIG. 7 (in other words, in the case where the specification unit 104 determines that the current reproduction timing is not a scene change timing). Note that, in this case, a position of a point of view during reproduction of the video (during display of the video) may be the same as a position of the video production device 20 during taking the video. Alternatively, for example, in the case where the video is a free-viewpoint video, the position of the point of view of each user (who views the video) may be an arrangement position of the avatar 54 corresponding to each user in the virtual space 42. In addition, for example, the position of the point of view may be changed to any position in the virtual space 42 in response to an instruction from the user or the like.

In addition, in the example illustrated in FIG. 8 (in other words, in the case where the specification unit 104 determines that the current reproduction timing is a scene change timing), the change unit 106 changes the current row 60 of the plurality of avatars 54 to a single longitudinal row illustrated in FIG. 8 such that the plurality of avatars fall within the empty space 52*b*. Note that, in this case, a position of a point of view during reproduction of the video (during display of the video) may be a position of the video production device 20 during taking the video, or may be an arrangement position of the avatar 54 corresponding to each user in the virtual space 42, for each user (who views the video). Alternatively, positions of points of view of a plurality of users may be an arrangement position of a leading avatar 54*a* among the plurality of avatars arranged in the single longitudinal row (illustrated in FIG. 8). This can avoid blocking of a field of view of the user corresponding to the avatar 54*b* by the leading avatar 54*a*. The avatar 54*b* is arranged behind the leading avatar 54*a*. In addition, in the case where the avatars 54 have different body heights, positions of points of view may be automatically set in ascending order of body height of the avatars from a leading avatar.

Note that, users may communicate with each other in the virtual space 42 even when they are in the single longitudinal row. In the case where the arrangement position of the single avatar 54*a* is used as the positions of points of view of the plurality of users, it is desirable to correct voice directions and movement directions (such as gaze directions, face directions, or body directions) of the users to establish appropriate communication. A specific example of such correction control will be described below on the assumption that a user A and a user B are in a single longitudinal row while viewing a video.

On the basis of the above described assumption, the user A may recognize that the user B is behind the user A. Therefore, in the case where the user A speaks to the user B in the real world, it is considered that the user A turns around and speaks backward in the real world. However, in the virtual space 42 seen by the user B, the user A is behind the user B. Therefore, if the voice direction and the movement direction of the user A in the real world are applied to the virtual space 42 of the user B without any change, the user B recognizes the user A as if the user A speaks backward although nobody is there. Such messed-up communication may also occur in the case where the user B speaks to the user A.

To avoid or suppress such messed-up communication with regard to voice directions and movement directions in the virtual space 42, it is desirable to correct a virtual space 42 to be provided to each of the user A and user B, as described below. First, in the case where the user A speaks to the user B, the voice direction and the movement direction of the user A are applied to the virtual space 42 of the user A without any change. Next, the voice direction and the movement direction of the user B in the virtual space 42 of the user A are substantially fixed such that the voice direction and the movement direction of the user B becomes directions toward the user A regardless of change in the voice direction and the movement direction of the user B in the real world. On the other hand, correction control similar to the process performed in the virtual space 42 of the user A is performed in the virtual space 42 of the user B. By performing such correction control, it is possible to avoid or suppress messed-up communication while both user A and the user B continue viewing the video at the leading arrangement position. In other words, it is only necessary to fix a voice direction and a movement direction of the rear avatar 54*b* such that the voice direction and the movement direction of the rear avatar 54*b* becomes directions toward the leading avatar 54*a* in the virtual space 42 of each user.

Note that, the case where two users (user A and user B) are viewing the video has been described in the above assumption. However, a similar process can be used even in the case where the number of users is three or more. In specific, it is only necessary to fix voice directions and movement directions of all the avatars 54*b* such that the voice directions and the movement directions of all the avatars 54b becomes directions toward the leading avatar 54a in the virtual space 42 of each user.

Modification

Note that, in this modification, the change unit 106 may change a current row such that the plurality of avatars 54 forms a row perpendicular (height direction) to the horizontal plane in the virtual space 42 (instead of changing the row of the avatars 54 within the horizontal plane as illustrated in FIG. 8), when the specification unit 104 specifies that the current reproduction timing is the scene change timing. Alternatively, the change unit 106 may change (compress) the current row such that parts (or all) of the plurality of avatars 54 overlap with each other, without changing the row direction of the plurality of avatar 54.

(2-1-4-3. Change in Number of Avatars)

In addition, it is also possible for the change unit 106 to change the number of avatars to be arranged in the virtual space corresponding to a reproduction target video in accordance with information regarding an empty space at each reproduction timing of the video, among respective avatars corresponding to the plurality of users viewing the video. For example, when the specification unit 104 specifies that a current reproduction timing is a scene change timing during reproduction of a video, the change unit 106 changes the number of avatars to be arranged in the virtual space in accordance with information regarding an empty space at that timing.

For example, when the specification unit 104 specifies that a current reproduction timing is a scene change timing during reproduction of a video, the change unit 106 may change the number of avatars to be arranged in the virtual space such that only avatars corresponding to users who satisfies a predetermined condition (or avatars satisfying a predetermined condition) are arranged in the virtual space among a plurality of users viewing the video.

Here, for example, the predetermined condition may be a condition corresponding to a scene after change. For example, the change unit 106 may arrange only avatars corresponding to adult users or child users in the virtual space. Alternatively, the change unit 106 may arrange only avatars corresponding users with a smile in the virtual space at that timing. Alternatively, the change unit 106 may arrange only avatars corresponding users with red clothing in the virtual space. Alternatively, the change unit 106 may arrange only (the plurality of users and) other users with friendship levels of a predetermined value or more with respect to the plurality of respective users on a social networking service (SNS) in the virtual space. In other words, it is possible to group users having similar, same, or related attribute information and change arrangement of avatars such that only the grouped users are displayed at a scene change timing. In such examples, arrangement target avatars are appropriately selected in accordance with scenes. Therefore, it is possible to widen communication between users or boost the communication.

Next, with reference to FIG. 10, details of the above described functions will be described. FIG. 10 is a diagram illustrating an example of a virtual space (virtual space 42) at the reproduction timing same as the example illustrated in FIG. 8. Accordingly, (in a way similar to the example illustrated in FIG. 8), the specification unit 104 may determine that the reproduction timing illustrated in FIG. 10 is the scene change timing. In this case, as illustrated in FIG. 10, the change unit 106 may change the number of avatars to be arranged in the virtual space 42 to the maximum number of avatars (in this case, one avatar) capable of falling within an empty space 52c without changing the current row 60, for example. Note that, in this case, an avatar corresponding to a user himself/herself alone may be continuously arranged in the virtual space for each user viewing the reproduction target video.

Note that, for example, in the case where it is impossible to arrange any avatar in an empty space indicated by information regarding the empty space, the change unit 106 may decide that avatars corresponding to all the users are excluded from arrangement targets. Therefore, in this case, the change unit 106 may decide that (not only avatars corresponding to other users but also) an avatar corresponding to each user himself/herself viewing the video are excluded from the arrangement target.

Modification

Alternatively, in the case where a condition set by a producer in association with the scene change timing is registered in meta information, the predetermined condition may be the condition registered in the meta information. For example, in the case where the producer wants to make a situation where users viewing the video feel alone, a condition that an avatar corresponding to a user himself/herself alone is arranged may be registered in the meta information.

(2-1-4-4. Change in Display Form)

Avatar Change Example 1

In addition, it is also possible for the change unit 106 to dynamically change display forms of one or more avatars to be arranged in a virtual space corresponding to a reproduction target video. For example, the change unit 106 may change display forms of a plurality of avatars to be displayed in the virtual space in accordance with the number of users viewing the video. As an example, in the case where a current row of avatars corresponding to respective users viewing the video does not fall within an empty space during reproduction of the video, the change unit 106 may change a display form of an avatar that temporarily goes out of the empty space, for example. For example, the change unit 160 may change setting such that the avatar that goes out of the empty space is displayed in a semi-transmissive form or in a wire frame form. Accordingly, for example, it is possible to avoid the video being significantly messed up without changing the current row of avatars.

Avatar Change Example 2

In addition, for example, in the case where some avatars among all avatars corresponding to respective users who is viewing a reproduction target video are not within an empty space, the change unit 106 may reduce the number of arrangement target avatars such that the arrangement target avatars falls within the empty space, and may change display forms of the respective avatars to show that the respective arrangement target avatars correspond to the plurality of users. For example, in this case, the change unit 106 first associates the respective arrangement target avatars with the plurality of users. Next, the change unit 106 displays an avatar corresponding to a representative user in a normal display size among the plurality of users corresponding to the respective avatars, and displays the other avatars corresponding to the users other than the representative user such that the other avatars are behind the avatar of the representative user (by using shadows, for example). Note that, in this case, a position of a point of view during reproduction of the reproduction target video may be set to be an arrangement position of the avatar corresponding to the representative user of the group including the users for each user viewing the video.

Alternatively, in such a case, it is also possible for the change unit 106 to reduce the sizes of the respective avatar corresponding to all the users viewing the reproduction target video such that all the avatars fall within the empty space. Alternatively, in such a case, it is also possible for the change unit 106 to change some or all of respective avatars corresponding to all the users viewing the video from three-dimensional objects to two-dimensional objects (such as flat objects). This can reduce the sizes of the avatars.

Avatar Change Example 3

In addition, for example, the change unit 106 may consecutively change display forms of respective avatars in accordance with scenes at scene change timings each time the specification unit 104 specifies that the current reproduction timing is the scene change timing during reproduction of the video. For example, it is possible for the change unit 106 to change clothing of the respective avatars, decorate the respective avatars, or change the display sizes of the respective avatars, in accordance with the scene at the scene change timing. For example, in the case where the scene at the scene change timing includes a video of "ocean", the change unit 106 may change clothing of the respective avatars to swimwear. Alternatively, in the case where the scene at the scene change timing includes a "video of a dancing person", the change unit 106 may change clothing of the respective avatars to dance costumes. Alternatively, in the case where the scene at the scene change timing includes a video of "an inside of a castle", the change unit 106 may change clothing of the respective avatars to suits or dresses.

Change in Object Related to Avatar

Figure 11:
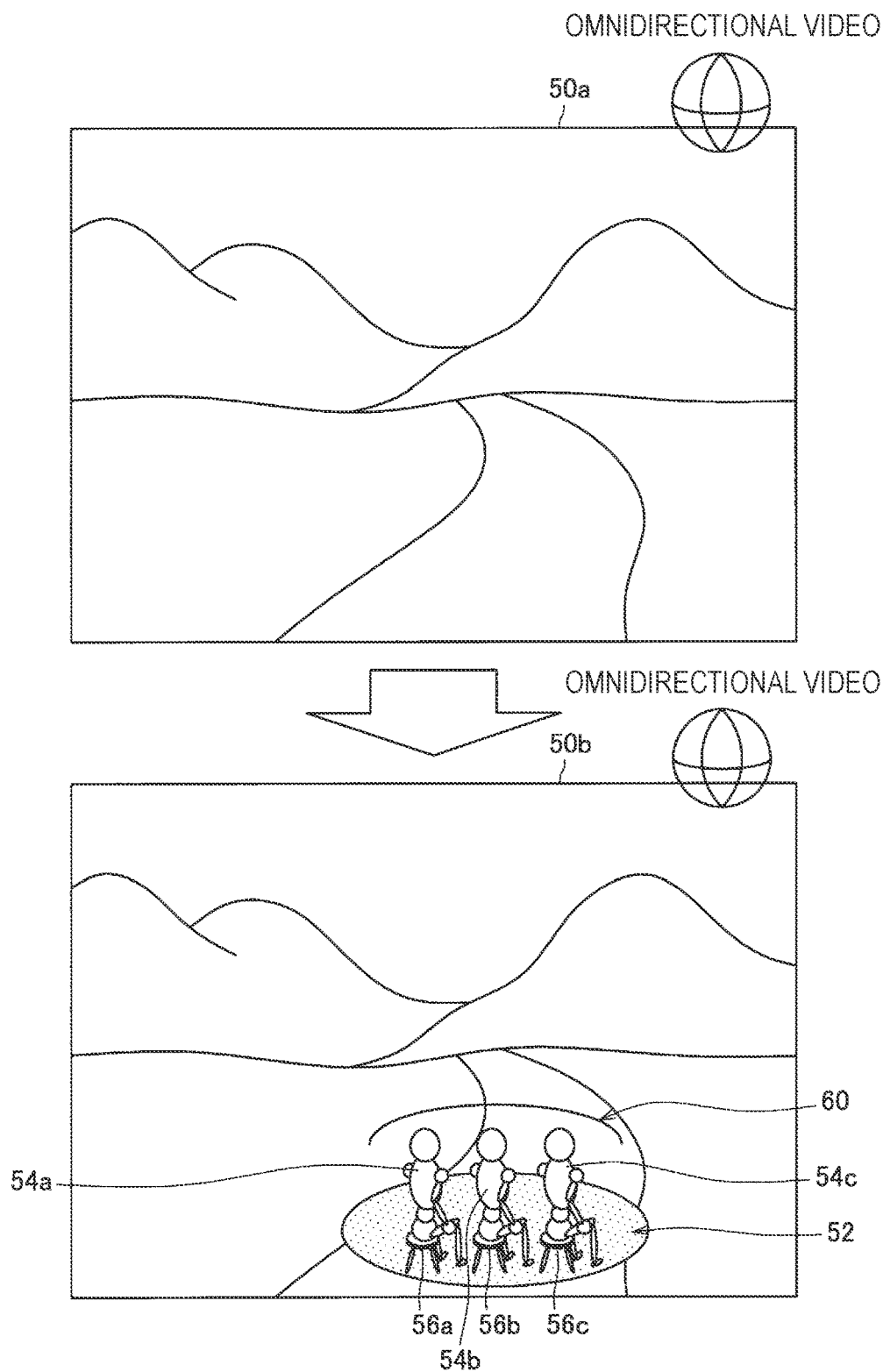
FIG. 11 is a diagram schematically illustrating an example of displaying a reproduction target video by the reproduction device 30.

In addition, the change unit 106 may change display forms of objects related to avatars corresponding to respective users in accordance with reproduction of a reproduction target video. For example, as illustrated in FIG. 11, in the case of displaying chairs 56 in which the respective avatars 54 are sitting in addition to the avatars 54, the change unit 106 may change display forms of the chairs 56 in accordance with reproduction of a reproduction target video. For example, in the case where the current reproduction timing is a scene change timing and the scene at this timing includes a video of a "forest" during reproduction of a video, the change unit 106 may change the chairs 56 into tree stumps. Alternatively, in the case where the scene at this timing includes a video of a "cave", the change unit 106 may change the chairs 56 into rocks.

{2-1-5. Display Control Unit 108}

(2-1-5-1. Video Display Control)

The display control unit 108 controls display of reproduction target videos on reproduction devices 30. For example, the display control unit 108 may cause an avatar to be superimposed and displayed on a reproduction target video in accordance with arrangement (such as position and attitude) of the avatar in a virtual space corresponding to the video decided by the change unit 106. As an example, the display control unit 108 causes a reproduction device 30 worn by each user viewing the reproduction target video to display a video of the virtual space corresponding to the video from a position of a predetermined point of view of each user at each reproduction timing. Here, as described above, the position of the predetermined point of view may be arrangement position of an avatar corresponding to each user in the virtual space.

Figure 12:
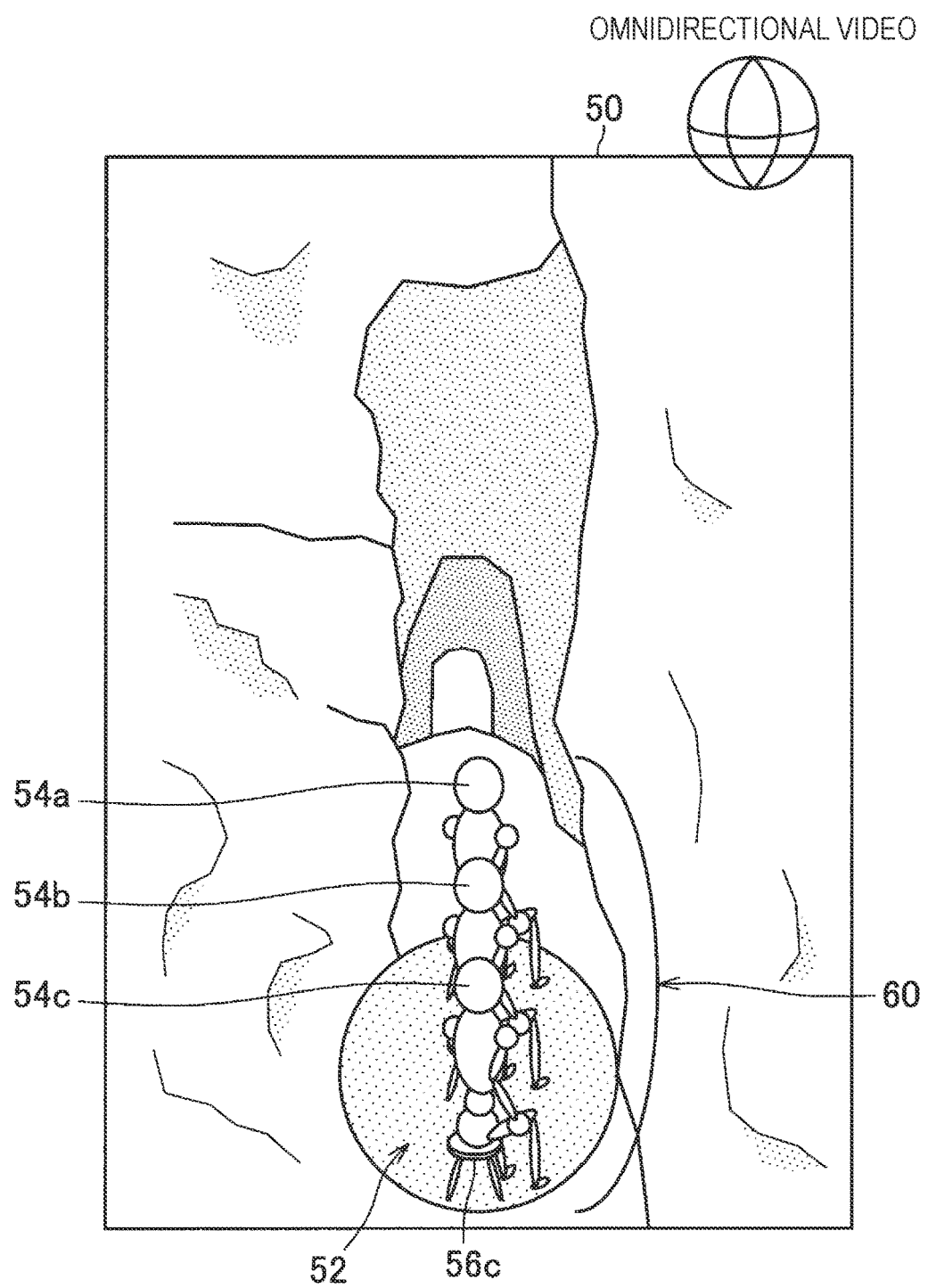
FIG. 12 is a diagram schematically illustrating an example of displaying a reproduction target video by the reproduction device 30.

FIG. 11 and FIG. 12 are each a diagram schematically illustrating an example of displaying a reproduction target video (video 50) by a reproduction device 30. Note that, FIG. 11 and FIG. 12 illustrates examples in which the video 50 is an omnidirectional video. In addition, FIG. 11 and FIG. 12 illustrate examples in which three users are viewing the video 50. In addition, FIG. 11 illustrates an example in which the change unit 106 decides to arrange respective avatars 54 corresponding to three users in a row 60 in an empty space 52 (in a virtual space corresponding to the video 50) such that the avatars 54 are lined up in a single lateral row. In this case, as illustrated in FIG. 11, the display control unit 108 causes videos of the respective avatars 54 arranged by the change unit 106 to be superimposed on a video 50b, and causes respective reproduction devices 60 worn by the three users to display the video 50b.

In addition, FIG. 12 illustrates an example in which the change unit 106 decides to arrange respective avatars 54 corresponding to three users in a row 60 in an empty space 52 (in a virtual space corresponding to the video 50) such that the avatars 54 are lined up in a single longitudinal row. In this case, as illustrated in FIG. 12, the display control unit 108 causes videos of the respective avatars 54 arranged by the change unit 106 to be superimposed on a video 50, and causes respective reproduction devices 60 worn by the three users to display the video 50. Accordingly, it is possible to avoid the video 50 being messed up while displaying the avatars 54 corresponding to the respective users superimposed on the video 50 even in a scene in which the users go through a narrow place, for example. Note that, FIG. 11 and FIG. 12 illustrates an example in which the chairs 56 in which the respective avatars 54 are sitting are displayed in addition to the respective avatars 54. However, the embodiment is not limited thereto. For example, it is not necessary to display the chairs 56.

Modification

Note that, as a modification, it is also possible for the display control unit 108 to control display on the reproduction devices 30 worn by the respective users on the basis of designation made by the respective users. For example, in the case where a user 2a designates an avatar corresponding to another user 2b (such as an avatar next to the avatar of the user 2a) to be hidden, the display control unit 108 may control a reproduction device 30 won by the user 2a such that the reproduction device 30 worn by the user 2a does not display the avatar corresponding to the user 2b.

(2-1-5-2. Relevant Information Display Control)

Display of Empty Space Range

Figure 13:
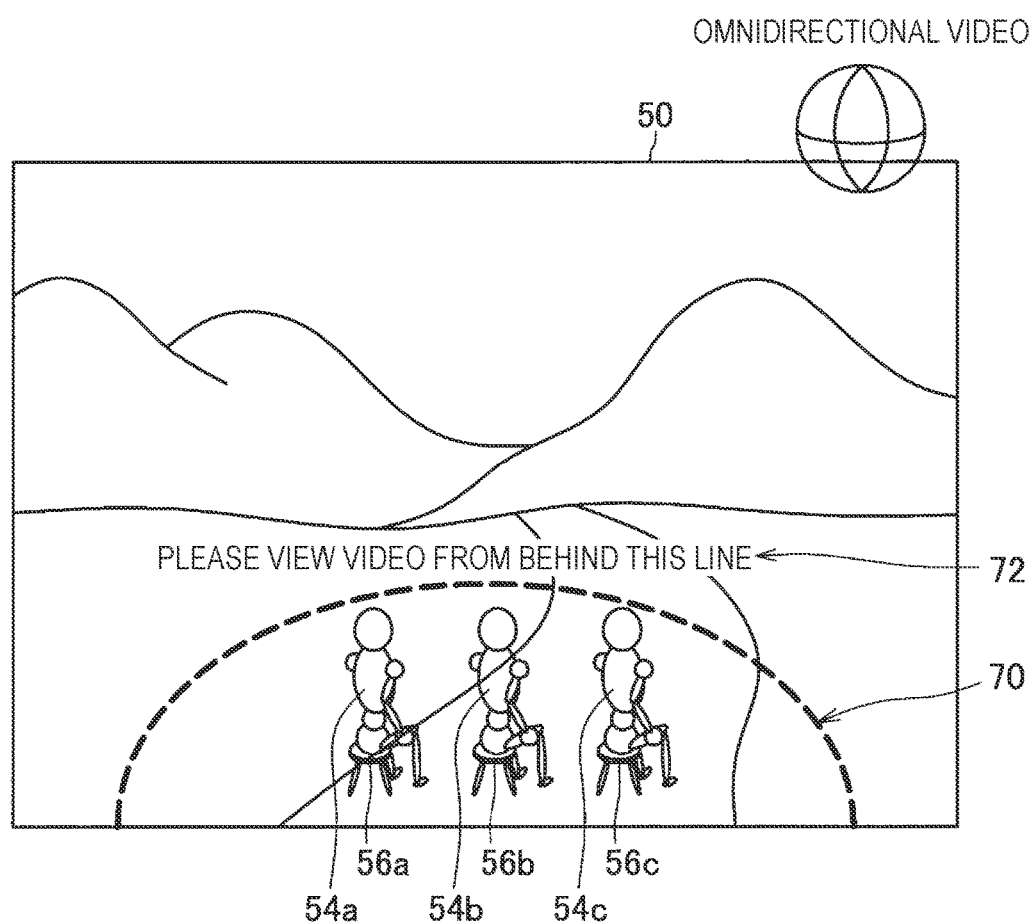
FIG. 13 is a diagram illustrating an example of displaying relevant information related to a reproduction target video.

In addition, it is also possible for the display control unit 108 to cause the respective reproduction devices 30 worn by the plurality of users viewing the reproduction target video to display relevant information related to the video during displaying the video. For example, as illustrated in FIG. 13, the display control unit 108 causes the video 50 to be displayed such that display 70 is superimposed on the video 50 during reproduction of the video. The display 70 indicates the range of an empty space at the current reproduction timing. In addition, as illustrated in FIG. 13, it is also possible for the display control unit 108 to cause the video 50 to be displayed such that a message 72 is superimposed on the video 50. The message 72 prompts users to view the video within the empty space range.

Display Depending on Communication

In addition, it is also possible for the display control unit 108 to change a video displayed on the reproduction device 30 worn by at least one user in accordance with content of communication among a plurality of users viewing a reproduction target video during display of the video. For example, in the case where it is detected that another user 2b viewing the video says "please look at me" to a user 2a viewing the video, the display control unit 108 may cause the reproduction device 30a worn by the user 2a to additionally display a wipe image or guide display toward an angle of view of the user 2b. Here, the guide display may be an arrow pointing toward a direction of the angle of view of the user 2b or may be display indicating an object that the user 2b is focusing on (such as a line surrounding the object). In addition, the wipe image may be an animation in which the video currently displayed on the reproduction device 30a is gradually shifted to a video currently displayed on the reproduction device 30b worn by the user 2b.

Note that, in this case, the display control unit 108 may causes the reproduction device 30b worn by the user 2b to additionally display a predetermined virtual object until a field of view of the user 2a is changed as the user 2b has designated. Accordingly, the user 2b can understand whether the field of view of the user 2a is changed as the user 2b has designated.

Display of Fields of View of Respective Users

Figure 14:
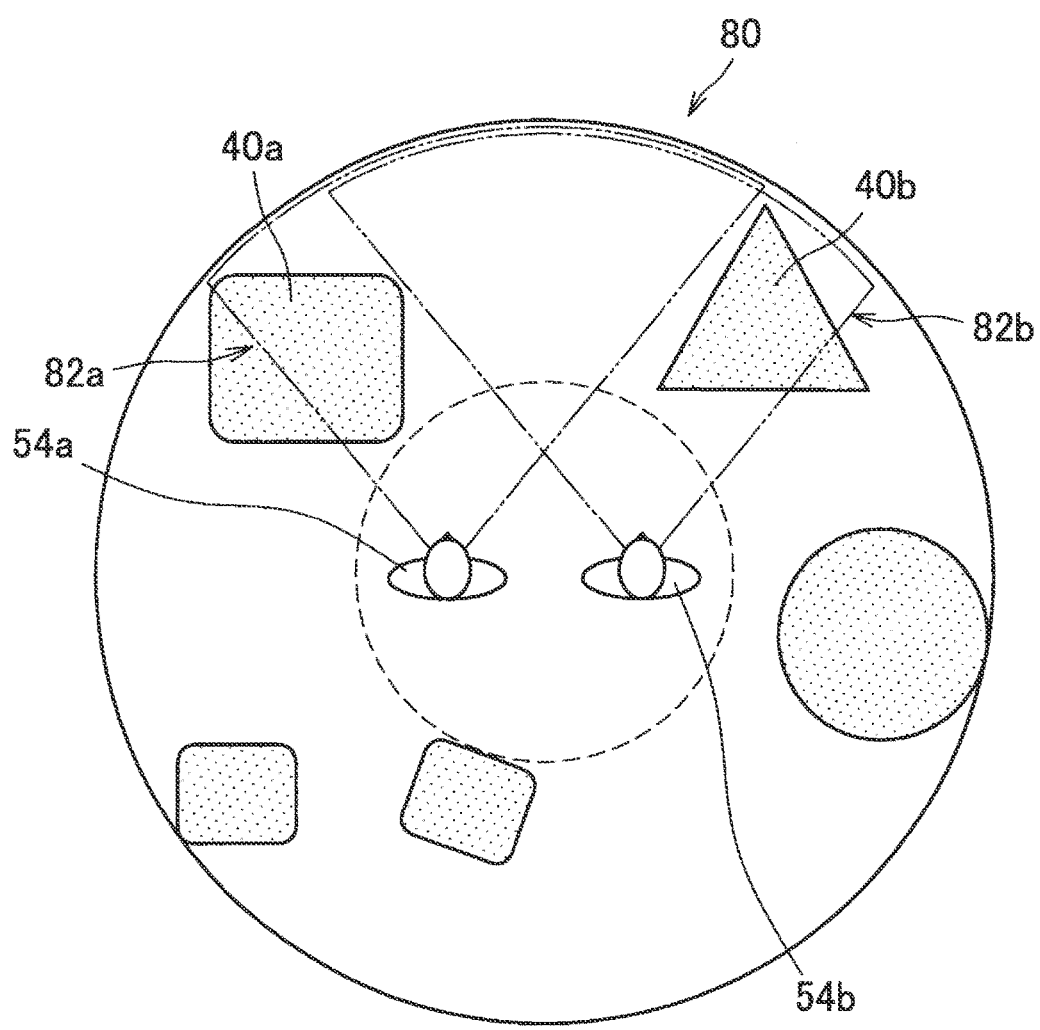
FIG. 14 is a diagram illustrating an example of display showing fields of view of respective users in a virtual space.

In addition, in such a case, the display control unit 108 may cause the reproduction device 30a worn by the user 2a (and the reproduction device 30b worn by the user 2b) to additionally display a bird's-eye view showing fields of view of the respective users in the virtual space corresponding to the video as illustrated in FIG. 14. Here, with reference to FIG. 14, a display example of a bird's-eye view (bird's-eye view 80) will be described. FIG. 14 illustrates an example in which two users (user 2a and user 2b) are viewing a reproduction target video at the same time. In addition, FIG. 14 illustrates an example in which an avatar 54a corresponding to the user 2a and an avatar 54b corresponding to the user 2b are arranged side-by-side in a lateral direction (illustrated in FIG. 14) in the virtual space. As illustrated in FIG. 14, the bird's-eye view 80 includes display 82a indicating the range of a field of view of the user 2a in the virtual space, and display 82b indicating the range of a field of view of the user 2b in the virtual space. Therefore, when the reproduction device 30a displays the bird's-eye view 80, the user 2a can understand relation between the range currently seen by the user 2a and the range currently seen by the user 2b.

Note that, the display 82a and the display 82b may respectively coincide with the actual ranges of fields of view of the user 2a and the user 2b (completely). In addition, FIG. 14 illustrates the example in which the display 82 (indicating the range of the field of view of each user) is a circular sector. However, the display 82 is not limited thereto. The display 82 may be a part of a circumference (arc) illustrated in FIG. 14, which corresponds to the field of view of each user on one-to-one basis. In addition, in the bird's-eye view 80, a display form (such as display color) of an object 40 in the field of view of another user 2b may be different from a normal display form.

(2-1-5-3. Reflection of Information Regarding Real Space)

In addition, it is also possible for the display control unit 108 to cause a reproduction target video to be displayed while display indicating a result of sensing performed in a real space where a user viewing the video is located is superimposed on the reproduction target video during display of the reproduction target video. For example, the display control unit 108 may cause the video to be displayed while information indicating danger in the real space where the user is located is superimposed on the video. Here, the information indicating danger may indicate that there is an object near the user such as "a chair is on your right side" or "dangerous if going right", for example.

{2-1-6. Communication Unit 120}

For example, the communication unit 120 may include a communication device 162 (to be described later). The communication unit 120 exchanges information with another device. For example, the communication unit 120 receives videos and meta information from the video production device 20. In addition, the communication unit 120 receives video reproduction requests from the reproduction devices 30. In addition, under the control of the display control unit 108, the communication unit 120 transmits a reproduction target video (on which videos of avatars are superimposed) to the reproduction devices 30.

{2-1-7. Storage Unit 122}

For example, the storage unit 122 may include a storage device 160 (to be described later). The storage unit 122 stores various kinds of data and various kinds of software. For example, as illustrated in FIG. 5, the storage unit 122 stores the video DB 124.

Note that, the configuration of the information processing device 10 according to the embodiment is not limited to the above described example. For example, the video DB 124 may be stored in another device (not illustrated) connected with the communication network 32 instead of being stored in the storage unit 122.

<2-2. Workflow of Process>

The configurations according to the embodiment have been described above. Next, with reference to FIG. 15 and FIG. 16, an example of a workflow of a process according to the embodiment will be described. Note that, next, an example of a workflow of a process will be described in the case where a plurality of users want to view a predetermined omnidirectional video registered in the information processing device 10 (video DB 124).

{2-2-1. Workflow of Entire Process}

Figure 15:
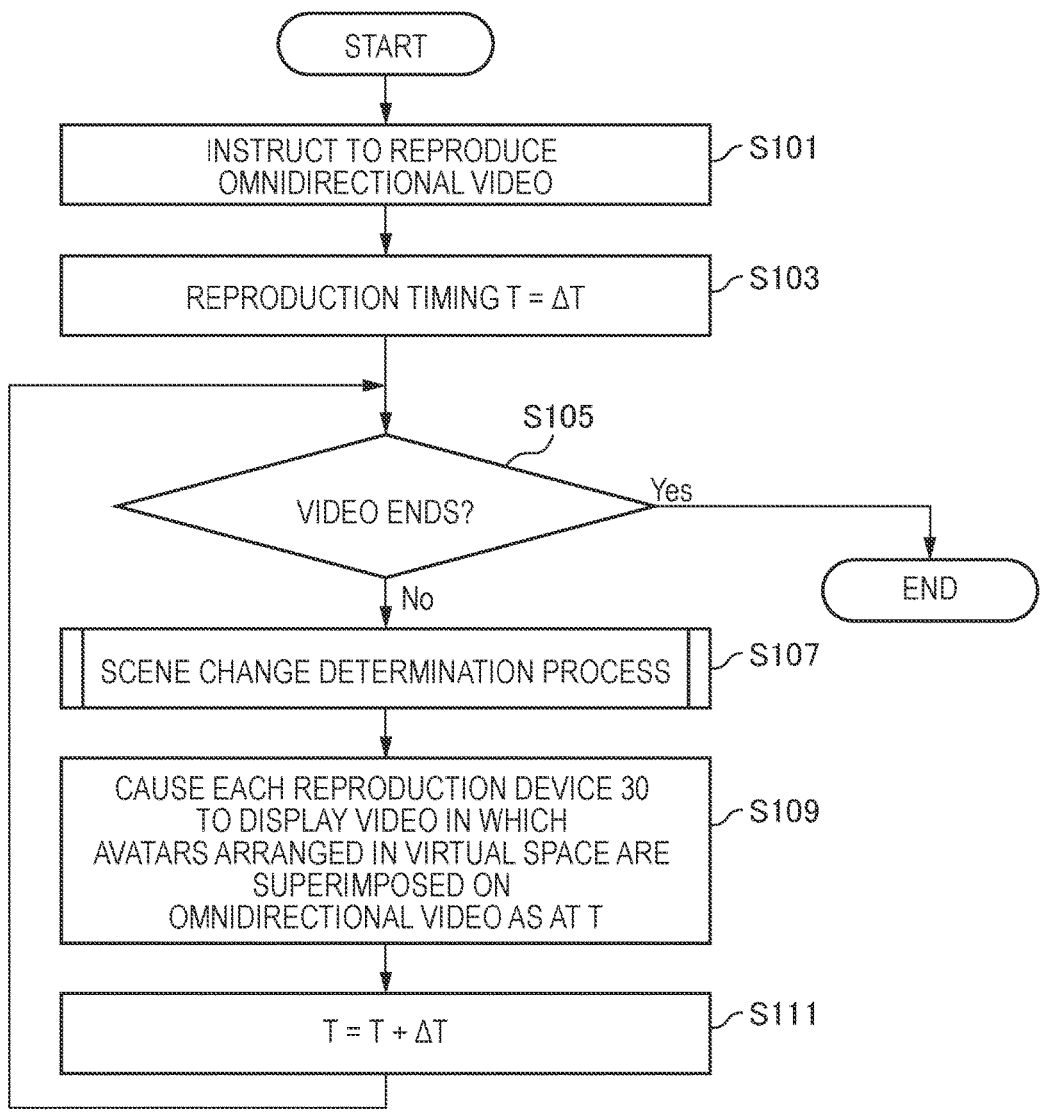
FIG. 15 is a flowchart illustrating workflow of an overall process according to the embodiment.

As illustrated in FIG. 15, each of a plurality of users first inputs an instruction to a reproduction device 30 worn by each of the users to reproduce a predetermined video. Next, each reproduction device 30 transmits a video reproduction request to the information processing device 10 on the basis of the input information (S101).

Subsequently, the control unit 100 of the information processing device 10 decides a reproduction target video on the basis of the video reproduction requests received from the plurality of the reproduction devices 30. Next, the control unit 100 sets a reproduction timing T of the video to micro time ΔT (S103). Here, ΔT corresponds to a time period of one frame.

Subsequently, the control unit 100 repeats the following process of S107 to S111 unless the reproduction timing T reaches the video end time (No in S105). Note that, in the case where T reaches the video end time (Yes in S105), the process ends.

In specific, the control unit 100 first performs a "scene change determination process" (to be described later) (S107).

Next, in response to a result of the process performed in S107, the display control unit 108 generates a video in which videos of respective avatars corresponding to the plurality of users are superimposed on the video (display frame) as at the reproduction timing T. Subsequently, the display control unit 108 causes the communication unit 120 to transmit the generated video to the respective reproduction devices 30 worn by the plurality of users (S109).

Next, the display control unit 108 adds ΔT to T (S111). Subsequently, the control unit 100 performs the process in S105 again.

{2-2-2. Scene Change Determination Process}

Figure 16:
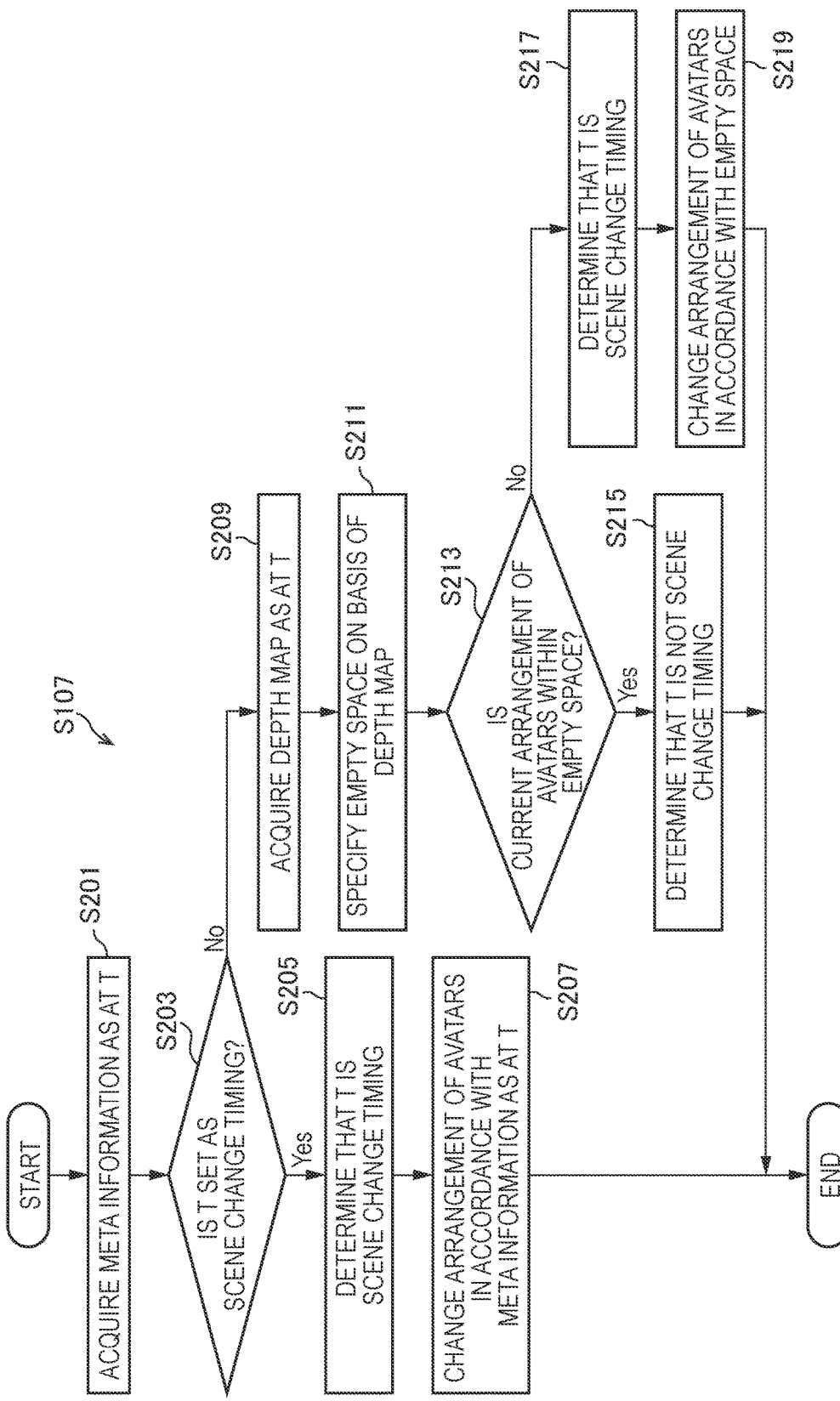
FIG. 16 is a flowchart illustrating workflow of a "scene change determination process" according to the embodiment.

Here, with reference to FIG. 16, workflow of the "scene change determination process" in S107 will be descried. As illustrated in FIG. 16, the specification unit 104 first extracts meta information associated with the video as at the reproduction timing T from the video DB 124 (S201).

Next, the specification unit 104 checks whether T is set as a scene change timing in the meta information (S203). In the case where T is set as the scene change timing (Yes in S203), the specification unit 104 determines that T is the scene change timing (S205). Subsequently, the change unit 106 changes arrangement of the respective avatars in a virtual space corresponding to the video in accordance with the meta information acquired in S201 (S207). Next, the "scene change determination process" ends.

On the other hand, in the case where T is not set as the scene change timing (No in S203), the specification unit 104 acquires a depth map as at T indicated by depth information associated with the video (S209).

Next, the specification unit 104 specifies information regarding an empty space as at T in a surrounding of a point of view of a camera at a time of recording the video on the basis of the acquired depth map (S211).

Subsequently, the specification unit 104 determines whether current arrangement (such as row) of the respective avatars is within the specified empty space (S213). In the case where it is determined that the current arrangement of the respective avatars is within the specified empty space (Yes in S213), the specification unit 104 determines that T is not the scene change timing (S215). Next, the "scene change determination process" ends.

On the other hand, in the case where it is determined that the current arrangement of the respective avatars is not within the specified empty space (No in S213), the specification unit 104 determines that T is the scene change timing (S215). Subsequently, the change unit 106 changes arrangement of the respective avatars in the virtual space corresponding to the video in accordance with the empty space specified in S211 (S219). Next, the "scene change determination process" ends.

<2-3. Effects>

As described above, it is possible for the information processing device 10 according to the embodiment to change arrangement of respective avatars corresponding to a plurality of users in a virtual space corresponding to a video with depth information, in accordance with reproduction of the video. Therefore, it is possible to appropriately change arrangement of the avatars corresponding to the respective users viewing the video, in accordance with reproduction of the video.

For example, when an empty space corresponding to a current reproduction timing is specified on the basis of the depth information and it is determined that current arrangement of avatars is not within the empty space during reproduction of the video, it is possible for the information processing device 10 to change the arrangement of the avatars corresponding to respective users such that the avatars fall within the empty space. Therefore, it is possible to provide a user with an experience as if the user is viewing the video in a virtual space together with other users, and it is possible to avoid the video being messed up.

<2-4. Application Example>

In the above embodiment, the example has mainly been described in which the information processing device 10 causes the reproduction devices 30 to display a video that has been taken by the video production device 20 in advance. Next, an application example of the embodiment will be described. As described below, it is possible for the information processing device 10 according to the application example to cause the reproduction devices 30 to display the video taken by the video production device 20 in real time.

{2-4-1. Configuration of Information Processing System}

FIG. 17 is an explanatory diagram illustrating a configuration example of an information processing system according to the application example. As illustrated in FIG. 17, in the application example, it is assumed that a videographer 6 wears a head-mounted video production device 90. In addition, as illustrated in FIG. 17, the videographer 6 may additionally wear a reproduction device 30c. Here, the video production device 90 may include a plurality of image capturing units 222 as illustrated in FIG. 17. For example, it is possible for the video production device 90 to take a video of entire surroundings of the head of the videographer 6. In addition, the video production device 90 may acquire depth information in addition to taking the video by using the plurality of image capturing units 222, a depth sensor (not illustrated), or the like, for example. Note that, the videographer 6 can designate a scene change timing in real time in association with a video that the video production device 90 is taking.

In addition, it is possible for the video production device 90 to transmit the taken video and the depth information to the information processing device 10 in real time. Note that, the detailed functional configuration of the video production device 90 is substantially similar to the video production device 20 illustrated in FIG. 3.

In addition, the information processing device 10 according to the application example generates a delivery video (such as omnidirectional video) in real time on the basis of a video received from the video production device 90, and transmits the delivery video in real time to the reproduction devices 30 worn by one or more users 2 who are distant from a real space where the videographer 6 is located. Accordingly, the one or more users 2 can feel as if they were the videographer 6 by viewing the delivery video.

Note that, as a specific method for transmitting such an omnidirectional video from the videographer 6 to the users 2, a technology described in WO 2015/122108 may be used, for example.

{2-4-2. Configuration}

The configuration of the information processing system according to the application example has been described above. Next, details of the configuration of the information processing device 10 according to the application example will be described. Note that, description similar to the above described embodiment will be omitted.

(2-4-2-1. Specification Unit 104)

It is possible for the specification unit 104 according to the application example to specify information regarding an empty space around the videographer 6 in real time on the basis of depth information corresponding to the video taken by the video production device 90. Note that, as described above, the depth information may be specified on the basis of predetermined image processing performed on videos taken by the plurality of image capturing units 222 (included in the video production device 90), or may be information obtained through sensing performed by a sensor such as the depth sensor included in the video production device 90.

In addition, it is possible for the specification unit 104 to determine whether respective avatars corresponding to one or more users viewing the delivery video are within an empty space indicated by information regarding the specified empty space.

(2-4-2-2. Display Control Unit 108)

Display of Video

The display control unit 108 according to the application example causes the respective reproduction devices 30 corresponding to a plurality of users who view the delivery video to display the delivery video corresponding to the video taken by the video production device 90 in real time. Here, an omnidirectional video may be used as the delivery video. Alternatively, for example, in the case where a plurality of other cameras are installed around the video production device 90, the delivery video may be a free-viewpoint video based on videos taken by the video production device 90 and the plurality of other cameras.

Display of Avatar

In addition, it is possible for the display control unit 108 to cause the reproduction device 30c worn by the videographer 6 to display respective avatars corresponding to the one or more users viewing the video. For example, the display control unit 108 causes one or more avatars to be displayed in an area of the display unit 324 corresponding to an empty space around the videographer 6 while the specification unit 104 is determining that the one or more avatars are within the empty space. Therefore, the videographer 6 can recognize the users viewing the delivery video. As a result, the videographer 6 can establish smooth communication with these users when the videographer 6 and these users talk to each other on the phone.

Note that, for example, the videographer 6 can designate in real time whether to cause the reproduction device 30c to display the one or more avatars in response to a voice command or operation performed on a predetermined input device (not illustrated). For example, when the videographer 6 selects users (in real time) to talk among one or more users viewing the delivery video, the display control unit 108 may causes the reproduction device 30c to display only respective avatars corresponding to the selected users.

In addition, it is possible for the display control unit 108 to cause the respective reproduction devices 30 worn by the one or more users to display an avatar corresponding to the videographer 6 superimposed on the delivery video. For example, in the case where the delivery video is the free-viewpoint video, the display control unit 108 causes the avatar corresponding to the videographer 6 to be superimposed on the position of the video production device 90 in the delivery video.

(2-4-3. Effect)

As described above, it is possible for the information processing device 10 according to the application example to cause the reproduction devices 30 worn by the users 2 to display the delivery video corresponding to the video taken by the video production device 90 in real time. In addition, it is possible for the information processing device 10 to cause the reproduction device 30c worn by the videographer 6 to display respective avatars corresponding to the one or more users viewing the delivery video, in real time. Therefore, it is possible to provide the users and the videographer who are viewing the delivery video, with experiences as if they move together.

«3. Hardware Configuration»

Next, with reference to FIG. 18, a hardware configuration of the information processing device 10 according to the embodiment will be described. As illustrated in FIG. 18, the information processing device 10 includes a CPU 150, read only memory (ROM) 152, RAM 154, a bus 156, an interface 158, a storage device 160, and a communication device 162.

The CPU 150 functions as an arithmetic processing device and a control device to control all operation in the information processing device 10 in accordance with various kinds of programs. In addition, the CPU 150 realizes the function of the control unit 100 in the information processing device 10. Note that, the CPU 150 is implemented by a processor such as a microprocessor.

The ROM 152 stores control data such as programs and operation parameters used by the CPU 150.

The RAM 154 temporarily stores programs executed by the CPU 150, data used by the CPU 150, and the like, for example.

The bus 156 is implemented by a CPU bus or the like. The bus 156 mutually connects the CPU 150, the ROM 152, and the RAM 154.

The interface 158 connects the storage device 160 and the communication device 162 with the bus 156.

The storage device 160 is a data storage device that functions as the storage unit 122. For example, the storage device 160 may include a storage medium, a recording device which records data in the storage medium, a reader device which reads data from the storage medium, a deletion device which deletes data recorded in the storage medium, and the like.

For example, the communication device 162 is a communication interface implemented by a communication device for connecting with the communication network 32 or the like (such as a network card). In addition, the communication device 162 may be a wireless LAN compatible communication device, a long term evolution (LTE) compatible communication device, or may be a wired communication device that performs wired communication. The communication device 162 functions as the communication unit 120.

«4. Modified Examples»

It should be understood by those skilled in the art that various modifications, combinations, sub-combinations and alterations may occur depending on design requirements and other factors insofar as they are within the scope of the appended claims or the equivalents thereof.

<4-1. First Modification>

For example, in the above embodiment, the example in which a plurality of users view a reproduction target video at the same time has been described. However, the present disclosure is not limited thereto. For example, in the case where a certain user 2a views a reproduction target video, the information processing device 10 may cause a reproduction device 30 worn by the user 2a to display the video on which an avatar of another user 2b who has viewed the video in the past is superimposed. In addition, in this case, the information processing device 10 may change the display position or the like of the avatar corresponding to the another user 2b in accordance with a result of recognizing behavior of the another user 2b while the another user 2b is viewing the video. According to this modification, it is possible to provide the user with an experience as if the user is viewing the reproduction target video together with another user who has viewed the reproduction target video in the past.

<4-2. Second Modification>

In addition, as another modification, it is possible for the information processing device 10 to analyze scenes related to the reproduction target video in advance before causing the reproduction device 30 to display the reproduction target video. Accordingly, it is possible to make the processes related to reproduction of the video more efficient.

<4-3. Third Modification>

In addition, as another modification, for example, in the case where it is newly determined that at least one avatar is not an arrangement target avatar at a scene change timing, the display control unit 108 may control display such that the at least one avatar fades out (such as gradually increasing transparent level of the at least one avatar) and then the at least one avatar gets hidden. In addition, for example, in the case where at least one new avatar is arranged in a virtual space corresponding to a reproduction target video at a scene change timing or the like, the display control unit 108 may cause the at least one avatar to be displayed after causing the at least one avatar to fade in (such as gradually reducing the transparent level) from several frames before arranging the at least one avatar. In addition, in the case where a display form of an avatar (such as clothing of the avatar) is changed to another display form, the display control unit 108 may gradually change the display form of the avatar from several frames before the change timing.

<4-4. Fourth Modification>

In addition, as another modification, in the case of fast forwarding a video, the display control unit 108 may control display such that the other avatars get hidden regardless of scene change timing. Accordingly, it is possible to suppress increase in load of an avatar rearrangement process that occurs with fast forwarding of the video. In addition, in the case of fast forwarding the video, stereoscopic display of a video on the display unit 324 may be banned. Specifically, it is preferable that one of a right-eye image and a left-eye image be displayed on both the right-eye display unit 324a and the left-eye display unit 324b. Therefore, it is possible to reduce a processing load that occurs with rapid switching of stereoscopic display, and it is possible to suppress increase in load on the eyes of the user. In addition, in the case of fast forwarding a video, display of the video may be switched along with a morphing process such that the entire stereoscopic video is displayed on a flat window (two-dimensional window) arranged in a virtual space. Accordingly, it is possible to suppress increase in load of an avatar rearrangement process that occurs with fast forwarding of the video, and it is possible to maintain communication between users during fast forwarding of the video.

<4-5. Fifth Modification>

In addition, as another modification, in the case where at least one new avatar is arranged in a virtual space corresponding to a reproduction target video, the information processing device 10 may notify a reproduction device 30 worn by each user corresponding to the at least one avatar that an avatar corresponding to each user is to be displayed a predetermined time before arranging the at least one avatar.

<4-6. Sixth Modification>

In addition, as another modification, it is possible for the information processing device 10 to cause the reproduction device 30 to display only display (such as arrows) indicating directions of arrangement positions of respective avatars corresponding to some users (or all users) among all the users viewing a reproduction target video, instead of causing the reproduction device 30 to display the avatars. Note that, when it is detected that at least one user among the some of the users has spoken in this case, the information processing device 10 may cause the reproduction device 30 to output the speech (as usual). According to the modification, it is possible to notify a user 2a of existence of another user 2b who is viewing the video simply by using speech voice and the display indicating a direction of an avatar.

<4-7. Seventh Modification>

In addition, as another modification, the reproduction device 30 may include the specification unit 104, the change unit 106, and the display control unit 108 instead of the information processing device 10. In this case, the reproduction device 30 may be used as the information processing device according to the modification of the present disclosure.

<4-8. Eighth Modification>

In addition, it is not necessary to execute the steps in the above described process according to the embodiment on the basis of the order described above. For example, the steps may be performed in a different order as necessary. In addition, the steps do not have to be performed chronologically but may be performed in parallel or individually. In addition, it is possible to omit some steps described above or it is possible to add another step.

In addition, according to the above described embodiment, it is also possible to provide a computer program for causing hardware such as the CPU 150, ROM 152, and RAM 154, to execute functions equivalent to the structural elements of the information processing device 10 according to the above described embodiment. Moreover, it may be possible to provide a recording medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing device including
a change unit configured to change arrangement of a first object corresponding to a first user and a second object corresponding to a second user from first arrangement to second arrangement in accordance with reproduction of a video including depth information, in a virtual space corresponding to the video.

(2) The information processing device according to (1),
in which the change unit is configured to change the arrangement of the first object and the second object from the first arrangement to the second arrangement in accordance with change in the depth information depending on the reproduction of the video.

(3) The information processing device according to (2),
in which the depth information indicates depth values at respective reproduction timings, each of the depth values being set to a surrounding of a point of view in the video at a corresponding time of recording the video.

(4) The information processing device according to (3), further including
a specification unit configured to specify, on a basis of the depth information, information regarding an empty space in the surrounding of the point of view at the corresponding time of recording the video for each of the respective reproduction timings of the video,
in which the change unit is configured to change the arrangement of the first object and the second object from the first arrangement to the second arrangement in accordance with change in the information regarding the empty space depending on the reproduction of the video.

(5) The information processing device according to (4), in which
the first object and the second object are three-dimensional virtual objects, and
the change unit is configured to change the arrangement of the first object and the second object from the first arrangement to the second arrangement further in accordance with a size of the first object and a size of the second object.

(6) The information processing device according to (5), in which
the first arrangement corresponds to a first row of the first object and the second object, the second arrangement corresponds to a second row of the first object and the second object, the specification unit further determines, at each of the respective reproduction timing of the video, whether the first row is within a space indicated by the information regarding the empty space, and when it is determined that the first row is not within the space, the change unit changes the arrangement of the first object and the second object from the first arrangement to the second arrangement.

(7) The information processing device according to (6), in which an arrangement direction of the first object and the second object corresponding to the second arrangement is different from an arrangement direction of the first object and the second object corresponding to the first arrangement.

(8) The information processing device according to (6) or (7), in which an orientation of the first object corresponding to the second arrangement is different from an orientation of the first object corresponding to the first arrangement.

(9) The information processing device according to any one of (6) to (8), in which, each time it is determined that a current row of the first object and the second object is not within the space indicated by the information regarding the empty space corresponding to a current reproduction timing, the change unit changes the row of the first object and the second object such that the row of the first object and the second object falls within the space.

(10) The information processing device according to any one of (3) to (9), in which a plurality of users including the first user and the second user are users who view the video, and the change unit is further configured to change a number of objects to be arranged in the virtual space among respective objects corresponding to the plurality of users, in accordance with change in the depth information depending on the reproduction of the video.

(11) The information processing device according to (10), in which respective objects corresponding to the plurality of users are three-dimensional virtual objects, the information processing device further comprises a specification unit configured to specify information regarding an empty space in the surrounding of the point of view the corresponding time of recording the video for each of the respective reproduction timings of the video, on a basis of the depth information, and the change unit is configured to change a number of objects to be arranged in the virtual space in accordance with sizes of the respective objects corresponding to the plurality of users and change in the information regarding the empty space depending on the reproduction of the video.

(12) The information processing device according to (10) or (11), in which the change unit is further configured to change display forms of a plurality of objects to be arranged in the virtual space in accordance with a number of the plurality of users.

(13) The information processing device according to any one of (3) to (12), in which the change unit is further configured to change a display form of the first object or the second object in accordance with change in the depth information depending on the reproduction of the video.

(14) The information processing device according to any one of (3) to (13), in which the change unit is further configured to change arrangement of the first object in the virtual space on a basis of a result of recognizing movement of the first user in a first real space where the first user is located, and changes arrangement of the second object in the virtual space on a basis of a result of recognizing movement of the second user in a second real space where the second user is located.

(15) The information processing device according to (1), in which the video is associated with information indicating a scene change timing, the information processing device further comprises a specification unit configured to specify the scene change timing in accordance with the reproduction of the video, and in a case where the scene change timing is specified, the change unit changes arrangement of the first object and the second object in the virtual space from the first arrangement to the second arrangement.

(16) The information processing device according to (15), in which the second arrangement is arrangement of the first object and the second object indicated by setting information associated with the scene change timing.

(17) The information processing device according to any one of (2) to (16), in which the video is a first video, and the information processing device further comprises a display control unit configured to cause a first display unit and a second display unit to display a second video depending on the first video and the arrangement of the first object and the second object in the virtual space.

(18) The information processing device according to (17), in which, each time the change unit changes the arrangement of the first object and the second object, the display control unit causes the first display unit and the second display unit to display the second video depending on the changed arrangement of the first object and the second object.

(19) An information processing method including changing, by a processor, arrangement of a first object corresponding to a first user and a second object corresponding to a second user from first arrangement to second arrangement in accordance with reproduction of a video including depth information, in a virtual space corresponding to the video.

(20) At least one non-transitory computer-readable medium encoded with instructions which, when executed by at least one processor of an apparatus, cause the apparatus to:

change arrangement of a first object corresponding to a first user and a second object corresponding to a second user from first arrangement to second arrangement in accordance with reproduction of a video including depth information, in a virtual space corresponding to the video.

(21) A program causing a computer to function as a change unit configured to change arrangement of a first object corresponding to a first user and a second object corresponding to a second user from first arrangement to second arrangement in accordance with reproduction of a video including depth information, in a virtual space corresponding to the video.

What is claimed is:

1. An information processing device comprising:
a change unit configured to change arrangement of a first object corresponding to a first user and a second object corresponding to a second user from first arrangement to second arrangement in accordance with reproduction of a video including depth information, in a virtual space corresponding to the video; and a specification unit configured to specify, on a basis of the depth information, information regarding an empty space in a surrounding of a point of view at the corresponding time of recording the video for each of the respective reproduction timings of the video, wherein the change unit is configured to change the arrangement of the first object and the second object from the first arrangement to the second arrangement in accordance with change in the depth information and change in the information regarding the empty space depending on the reproduction of the video, wherein the depth information indicates depth values at respective reproduction timings, each of the depth values being set to the surrounding of the point of view in the video at a corresponding time of recording the video, and wherein the change unit and the specification unit are each implemented via at least one processor.

2. The information processing device according to claim 1, wherein the first object and the second object are three-dimensional virtual objects, and the change unit is configured to change the arrangement of the first object and the second object from the first arrangement to the second arrangement further in accordance with a size of the first object and a size of the second object.

3. The information processing device according to claim 2, wherein the first arrangement corresponds to a first row of the first object and the second object, the second arrangement corresponds to a second row of the first object and the second object, the specification unit further determines, at each of the respective reproduction timing of the video, whether the first row is within a space indicated by the information regarding the empty space, and when it is determined that the first row is not within the space, the change unit changes the arrangement of the first object and the second object from the first arrangement to the second arrangement.

4. The information processing device according to claim 3, wherein an arrangement direction of the first object and the second object corresponding to the second arrangement is different from an arrangement direction of the first object and the second object corresponding to the first arrangement.

5. The information processing device according to claim 3, wherein an orientation of the first object corresponding to the second arrangement is different from an orientation of the first object corresponding to the first arrangement.

6. The information processing device according to claim 3, wherein, each time it is determined that a current row of the first object and the second object is not within the space indicated by the information regarding the empty space corresponding to a current reproduction timing, the change unit changes the row of the first object and the second object such that the row of the first object and the second object falls within the space.

7. The information processing device according to claim 1, wherein a plurality of users including the first user and the second user are users who view the video, and the change unit is further configured to change a number of objects to be arranged in the virtual space among respective objects corresponding to the plurality of users, in accordance with change in the depth information depending on the reproduction of the video.

8. The information processing device according to claim 7, wherein the change unit is further configured to change display forms of a plurality of objects to be arranged in the virtual space in accordance with a number of the plurality of users.

9. The information processing device according to claim 1, wherein the change unit is further configured to change a display form of the first object or the second object in accordance with change in the depth information depending on the reproduction of the video.

10. The information processing device according to claim 1, wherein the change unit is further configured to
change arrangement of the first object in the virtual space on a basis of a result of recognizing movement of the first user in a first real space where the first user is located, and
change arrangement of the second object in the virtual space on a basis of a result of recognizing movement of the second user in a second real space where the second user is located.

11. The information processing device according to claim 1, wherein the video is associated with information indicating a scene change timing, wherein the specification unit is further configured to specify the scene change timing in accordance with the reproduction of the video, and wherein, in a case where the scene change timing is specified, the change unit changes arrangement of the first object and the second object in the virtual space from the first arrangement to the second arrangement.

12. The information processing device according to claim 11, wherein the second arrangement is arrangement of the first object and the second object indicated by setting information associated with the scene change timing.

13. The information processing device according to claim 1, wherein the video is a first video, wherein the information processing device further comprises a display control unit configured to cause a first display unit and a second display unit to display a second video depending on the first video and the arrangement of the first object and the second object in the virtual space, and wherein the display control unit is implemented via at least one processor.

14. The information processing device according to claim 13, wherein, each time the change unit changes the arrangement of the first object and the second object, the display control unit causes the first display unit and the second display unit to display the second video depending on the changed arrangement of the first object and the second object.

15. An information processing device comprising:

a change unit configured to change arrangement of a first object corresponding to a first user and a second object corresponding to a second user from first arrangement to second arrangement in accordance with reproduction of a video including depth information, in a virtual space corresponding to the video; and a specification unit configured to specify information regarding an empty space in a surrounding of a point of view at the corresponding time of recording the video for each of the respective reproduction timings of the video, on a basis of the depth information, wherein the change unit is configured to change the arrangement of the first object and the second object from the first arrangement to the second arrangement in accordance with change in the depth information depending on the reproduction of the video, wherein the depth information indicates depth values at respective reproduction timings, each of the depth values being set to the surrounding of the point of view in the video at a corresponding time of recording the video, wherein a plurality of users including the first user and the second user are users who view the video, wherein respective objects corresponding to the plurality of users are three-dimensional virtual objects, wherein the change unit is configured to change a number of objects to be arranged in the virtual space in accordance with sizes of the respective objects corresponding to the plurality of users and change in the information regarding the empty space depending on the reproduction of the video, wherein the change unit further configured to change the number of objects to be arranged in the virtual space among respective objects corresponding to the plurality of users, in accordance with change in the depth information depending on the reproduction of the video, and wherein the change unit and the specification unit are each implemented via at least one processor.

16. An information processing method comprising:
changing, by a processor, arrangement of a first object corresponding to a first user and a second object corresponding to a second user from first arrangement to second arrangement in accordance with reproduction of a video including depth information, in a virtual space corresponding to the video; and specifying, on a basis of the depth information, information regarding an empty space in a surrounding of a point of view at the corresponding time of recording the video for each of the respective reproduction timings of the video, wherein changing the arrangement of the first object and the second object from the first arrangement to the second arrangement is performed in accordance with change in the depth information and change in the information regarding the empty space depending on the reproduction of the video, and wherein the depth information indicates depth values at respective reproduction timings, each of the depth values being set to the surrounding of the point of view in the video at a corresponding time of recording the video.

17. At least one non-transitory computer-readable medium encoded with instructions which, when executed by at least one processor of an apparatus, cause the apparatus to execute a method, the method comprising:

changing arrangement of a first object corresponding to a first user and a second object corresponding to a second user from first arrangement to second arrangement in accordance with reproduction of a video including depth information, in a virtual space corresponding to the video; and specifying, on a basis of the depth information, information regarding an empty space in a surrounding of a point of view at the corresponding time of recording the video for each of the respective reproduction timings of the video, wherein changing the arrangement of the first object and the second object from the first arrangement to the second arrangement is performed in accordance with change in the depth information and change in the information regarding the empty space depending on the reproduction of the video, and wherein the depth information indicates depth values at respective reproduction timings, each of the depth values being set to the surrounding of the point of view in the video at a corresponding time of recording the video.

* * * * *